(12) United States Patent
Bullington et al.

(10) Patent No.: US 12,459,894 B2
(45) Date of Patent: Nov. 4, 2025

(54) ORALLY ACTIVE MELANOCORTIN RECEPTOR-4 COMPOUNDS

(71) Applicant: Palatin Technologies, Inc., Cranbury, NJ (US)

(72) Inventors: James Bullington, Hamilton Square, NJ (US); Axel Metzger, Jackson, NJ (US); John H. Dodd, Spring Mills, PA (US)

(73) Assignee: PALATIN TECHNOLOGIES, INC., Cranbury, NJ (US)

( * ) Notice: Subject to any disclaimer, the term of this patent is extended or adjusted under 35 U.S.C. 154(b) by 0 days.

(21) Appl. No.: 17/690,094

(22) Filed: Mar. 9, 2022

(65) Prior Publication Data

US 2022/0204450 A1 Jun. 30, 2022

Related U.S. Application Data

(63) Continuation of application No. PCT/US2019/051423, filed on Sep. 17, 2019.

(60) Provisional application No. 62/732,680, filed on Sep. 18, 2018.

(51) Int. Cl.
| | |
|---|---|
| *C07D 211/58* | (2006.01) |
| *A61K 45/06* | (2006.01) |
| *A61P 3/04* | (2006.01) |
| *C07D 401/12* | (2006.01) |

(52) U.S. Cl.
CPC ............ *C07D 211/58* (2013.01); *A61K 45/06* (2013.01); *A61P 3/04* (2018.01); *C07D 401/12* (2013.01)

(58) Field of Classification Search
CPC ........ C07D 211/58; C07D 401/12; A61P 3/04
See application file for complete search history.

(56) References Cited

U.S. PATENT DOCUMENTS

| | | | |
|---|---|---|---|
| 7,354,923 B2 | 4/2008 | Sharma et al. | |
| 7,718,802 B2 | 5/2010 | Sharma et al. | |
| 7,727,990 B2 | 6/2010 | Sharma et al. | |
| 7,727,991 B2 | 6/2010 | Sharma et al. | |
| 7,732,451 B2 | 6/2010 | Sharma et al. | |
| 9,493,456 B2 | 11/2016 | Bouvier et al. | |
| 2003/0232807 A1 | 12/2003 | Poindexter et al. | |
| 2021/0198201 A1* | 7/2021 | Bullington | A61K 31/496 |

FOREIGN PATENT DOCUMENTS

| | | | | |
|---|---|---|---|---|
| EP | 3150578 A1 | 4/2017 | | |
| WO | 2010/065799 A2 | 6/2010 | | |
| WO | 2010/065802 A2 | 6/2010 | | |
| WO | WO-2010065800 A1 * | 6/2010 | ........... | C07D 211/58 |
| WO | WO-2010065801 A1 * | 6/2010 | ........... | C07D 211/58 |
| WO | 2020/060983 A2 | 3/2020 | | |

OTHER PUBLICATIONS

J Clin Endocrinol Metab. 2601-2612, (2018)("Ayers"). (Year: 2018).*
24(5), Nat Med 551-555 (2018) ("Clément"). (Year: 2018).*
International Preliminary Report on Patentability received for PCT application No. PCT/US2019/051423, mailed on Apr. 1, 2021, 7 Pages.
International Search Report and Written Opinion received for PCT Application No. PCT/US2019/051423, mailed on Jan. 14, 2020, 10 pages.

* cited by examiner

*Primary Examiner* — James H Alstrum-Acevedo
*Assistant Examiner* — Manahil Mirghani Ali Abdalhameed
(74) *Attorney, Agent, or Firm* — POLSINELLI PC

(57) ABSTRACT

A compound of the formula

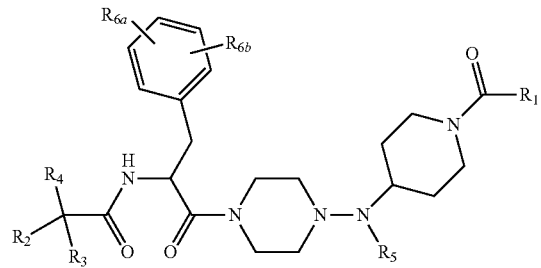

where $R_1$, $R_2$, $R_3$, $R_4$, $R_5$, $R_{6a}$, and $R_{6b}$ are as defined in the specification and claims, or an enantiomer, stereoisomer or diastereoisomer thereof, or a pharmaceutically acceptable salt thereof, and the use thereof in the treatment of diseases, disorders, syndromes and conditions responsive to modulation of a melanocortin receptor.

7 Claims, 2 Drawing Sheets

ORALLY ACTIVE MELANOCORTIN RECEPTOR-4 COMPOUNDS

CROSS-REFERENCE TO RELATED APPLICATION

This application claims priority to and the benefit of the filing of U.S. Provisional Patent Application Ser. No. 62/732,680 entitled "Orally Active Melanocortin Receptor-4 Compounds", filed Sep. 18, 2018, and International Application Number PCT/US2019/05143 entitled "Orally Active Melanocortin Receptor-4 Compounds", filed Sep. 17, 2019, and published as WO 2020/060983, and the specification and claims of each are incorporated herein by reference.

BACKGROUND OF THE INVENTION

Field of the Invention (Technical Field)

This invention provides substituted piperazine compounds that are agonists or partial agonists at melanocortin receptor-4 and use thereof in the treatment of a wide variety of diseases, syndromes and conditions, including in the treatment of obesity, diabetes, metabolic syndrome and related indications, diseases or disorders.

Background

A family of melanocortin receptor types and subtypes have been identified, including melanocortin receptor-1 (MC1 r) expressed on normal human melanocytes, melanoma cells and other cells; melanocortin receptor-2 (MC2r) for ACTH (adrenocorticotropin), expressed in cells of the adrenal gland; melanocortin receptor-3 and melanocortin receptor-4 (MC3r and MC4r), expressed in cells in the hypothalamus, mid-brain, brainstem and in peripheral tissues; and melanocortin receptor-5 (MC5r), expressed in a wide distribution of peripheral tissues. MC1 r is believed to be associated with hair and skin pigmentation, mediation of inflammation and other functions; MC2r is believed to mediate steroidogenesis; MC3r is believed to be associated with energy homeostasis, food intake, and inflammation; MC4r is believed to be associated with feeding behavior, energy homeostasis, and sexual functioning; and MC5r is believed to be involved in exocrine gland system regulation and other functions.

Significant work has been done in determining the structure of melanocortin receptors, including both the nucleic acid sequences encoding for the receptors and the amino acid sequences constituting the receptors. MC4r is a G protein-coupled, 7-transmembrane receptor that is expressed in the brain, particularly the paraventricular nucleus of the hypothalamus and the dorsal motor nucleus of the vagus nerve within the hindbrain, but is also expressed peripherally, including intestinal cells.

MC4r inactivation has been shown to result in obesity (Hadley, *Ann NY Acad Sci*, 885:1-21 (1999)), with activation of MC4r, through the endogenous agonist α-melanocyte stimulating hormone (α-MSH) or synthetic analogs, resulting in weight loss (Hsiung et al., *Endocrinology*, 146:5257-5266 (2005)). α-MSH is believed to be the principle endogenous MC4r agonist.

A number of small molecule compounds asserted to be agonists or partial agonists at one or more melanocortin receptors have been developed, including the compounds disclosed in EP3150578A1 (filed 28 May 2015, claiming priority to international application PCT/JP2015/065469), WO2010/065801A1 (PCT/US2009/066671, filed 4 Dec. 2009), WO2010/065802 A2 (PCT/US2009/066672, filed 4 Dec. 2009), WO2010/065800 A1 (PCT/US2009/066669, filed 4 Dec. 2009), WO2010/065799 A2 (PCT/US2009/066668, filed 4 Dec. 2009), and U.S. Pat. Nos. 9,493,456, 7,732,451, 7,727,991, 7,727,990, 7,718,802, and 7,354,923, among others. However, there are no approved small molecule melanocortin agonist or partial agonist products in the United States.

There is a significant need for compounds specific for MC4r for attenuating food intake and body weight gain, and for treatment of obesity, diabetes mellitus type 2, metabolic syndrome and related conditions and indications, as well as compounds specific for MC4r for treatment of conditions relating to various expression or receptor genetic diseases such as pro-opiomelanocortin deficiency due to mutations in the POMC gene (POMC heterozygous deficiency obesity), Prader-Willi syndrome, obesity due to MC4r deficiency, leptin receptor deficiency obesity, Bardet Biedl syndrome, Alström syndrome, and various other diseases, conditions, genetic deficiencies, metabolic disorders, and syndromes. It is against this background that the present invention was made.

SUMMARY OF THE INVENTION (DISCLOSURE OF THE INVENTION)

In one aspect, the invention provides compounds of formula I:

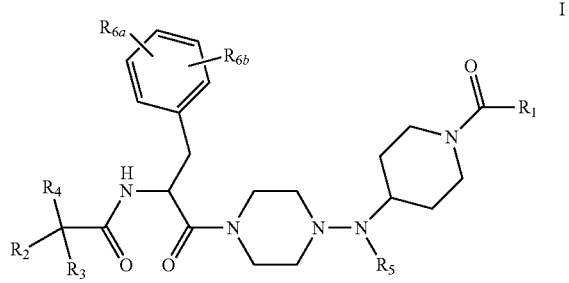

or an enantiomer, stereoisomer or diastereoisomer thereof, or a pharmaceutically acceptable salt thereof, wherein:

$R_1$ is —$R_7$ or —$NR_8R_9$;

$R_2$ and $R_3$ are each independently a $C_1$ to $C_{17}$ linear or branched alkyl, cycloalkyl, alkylcycloalkyl, aryl, and alkylaryl, optionally substituted with one or more substituents, and when one or more substituents are present, such substituents are the same or different and independently comprising oxo, carboxy, amino, monosubstituted amino, disubstituted amino, or nitro, and when $R_2$ and $R_3$ are different, including all sterioisomers thereof, provided that taken together $R_2$ and $R_3$ can form cycloalkyl, optionally substituted, or alternatively that taken together one of $R_2$ and $R_3$ and one of $R_8$ and $R_9$ comprising a part of $R_4$ can form heterocycloalkyl, optionally substituted;

$R_4$ is —OH, —$OR_7$, or —$NR_8R_9$;

$R_5$ is

H, a $C_1$ to $C_{17}$ linear or branched alkyl, cycloalkyl, or alkylcycloalkyl, a $C_1$ to $C_7$ acyl group, sulfonyl, carbamoyl or urea, in each instance optionally substituted with one or more substituents, and when one or more substituents are present, such substituents are the same or different and independently halo, amino, monosubstituted amino, disubstituted amino, hydroxy, or carboxy;

$R_{6a}$ and $R_{6b}$ are each independently H, alkyl, haloalkyl, cycloalkyl, alkoxy, alkythio, halo, nitro, acyl, cyano, aryl, alkylaryl, aryloxy, oxo, amino, monosubstituted amino, disubstituted amino, sulfonamide, hydroxy, carboxy, or alkoxy-carbonyl;

$R_7$ is a $C_1$ to $C_{17}$ linear or branched alkyl, cycloalkyl, or alkylcycloalkyl, optionally substituted with one or more substituents comprising oxo, terminal amide, amino, monosubstituted amino, disubstituted amino, or nitrile; and $R_8$ and $R_9$ are each independently H or a $C_1$ to $C_{17}$ linear or branched alkyl, cycloalkyl, or alkylcycloalkyl, optionally substituted with one or more substituents comprising oxo, amino, monosubstituted amino, disubstituted amino, or nitrile, provided that $R_8$ and $R_9$ taken together can form heterocycloakyl, optionally substituted.

In one aspect, in the compound of formula I the group $R_1$ is —$CH_3$, —$CH_2$—$CH_3$, or —CH—$(CH_3)_2$. In another aspect, in the compound of formula I the group $R_5$ is —H, —$CH_3$, —$CH_2$—$CH_3$, —CH—$(CH_3)_2$, —$CH_2$—CH—$(CH_3)_2$, —C(=O)—$CH_3$, —C(=O)—O—$CH_2$—$CH_3$, —C(=O)—NH—$CH_2$—$CH_3$, —C(=O)—CH—$(CH_3)_2$, or -methyl-cyclopropane. In yet another aspect, in the compound of formula I at least one of $R_{6a}$ and $R_{6b}$ are halo, or alternatively only one of $R_{6a}$ and $R_{6b}$ are halo.

In another aspect, the invention provides a compound of formula I wherein:

$R_1$ is —$R_7$;

$R_2$ and $R_3$ are each independently a $C_1$ to $C_{17}$ linear alkyl;

$R_4$ is —$NR_8R_9$;

$R_5$ is a $C_1$ to $C_{17}$ linear or branched alkyl;

$R_{6a}$ and $R_{6b}$ are each independently H or halo;

$R_7$ is a $C_1$ to $C_{17}$ linear or branched alkyl; and $R_8$ and $R_9$ are each independently H or a $C_1$ to $C_{17}$ linear or branched alkyl.

In yet another aspect, the invention provides a compound of formula I wherein:

$R_1$ is —$R_7$;

$R_2$ and $R_3$ are each independently a $C_1$ to $C_{17}$ linear alkyl which taken together form cycloalkyl;

$R_4$ is —$NR_8R_9$;

$R_5$ is a $C_1$ to $C_{17}$ linear or branched alkyl;

$R_{6a}$ and $R_{6b}$ are each independently H or halo;

$R_7$ is a $C_1$ to $C_{17}$ linear or branched alkyl; and $R_8$ and $R_9$ are each independently H or a $C_1$ to $C_{17}$ linear or branched alkyl.

In another aspect, the invention accordingly provides a compound of formula II:

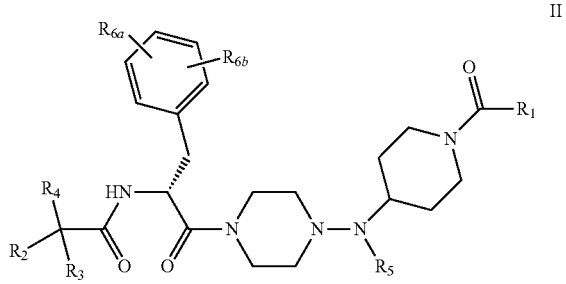

II wherein the variables $R_1$, $R_2$, $R_3$, $R_4$, $R_5$, $R_{6a}$, and $R_{6b}$ are as defined for formula I.

In another aspect, in the compound of formula II the group $R_1$ is —$CH_3$, —$CH_2$—$CH_3$, or —CH—$(CH_3)_2$. In yet another aspect, in the compound of formula II the group $R_5$ is —H, —$CH_3$, —$CH_2$—$CH_3$, —CH—$(CH_3)_2$, —$CH_2$—CH—$(CH_3)_2$, —C(=O)—$CH_3$, —C(=O)—O—$CH_2$—$CH_3$, —C(=O)—NH—$CH_2$—$CH_3$, —C(=O)—CH—$(CH_3)_2$, or -methyl-cyclopropane. In yet another aspect, in the compound of formula II at least one of $R_{6a}$ and $R_{6b}$ are halo, or alternatively only one of $R_{6a}$ and $R_{6b}$ are halo.

In another aspect, the invention provides a compound of formula II wherein:

$R_1$ is —$R_7$;

$R_2$ and $R_3$ are each independently a $C_1$ to $C_{17}$ linear alkyl;

$R_4$ is —$NR_8R_9$;

$R_5$ is a $C_1$ to $C_{17}$ linear or branched alkyl;

$R_{6a}$ and $R_{6b}$ are each independently H or halo;

$R_7$ is a $C_1$ to $C_{17}$ linear or branched alkyl; and $R_8$ and $R_9$ are each independently H or a $C_1$ to $C_{17}$ linear or branched alkyl.

In yet another aspect, the invention provides a compound of formula I wherein:

$R_1$ is —$R_7$;

$R_2$ and $R_3$ are each independently a $C_1$ to $C_{17}$ linear alkyl which taken together form cycloalkyl;

$R_4$ is —$NR_8R_9$;

$R_5$ is a $C_1$ to $C_{17}$ linear or branched alkyl;

$R_{6a}$ and $R_{6b}$ are each independently H or halo;

$R_7$ is a $C_1$ to $C_{17}$ linear or branched alkyl; and $R_8$ and $R_9$ are each independently H or a $C_1$ to $C_{17}$ linear or branched alkyl.

In yet another aspect, the invention provides a compound of formula III:

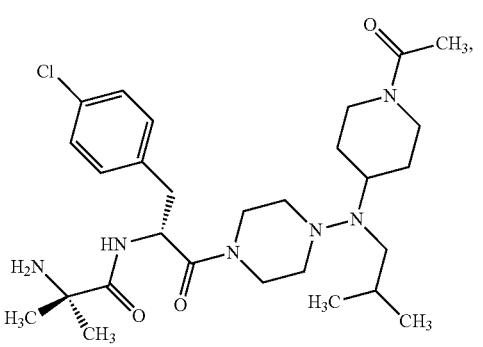

III

Including an enantiomer, stereoisomer or diastereoisomer thereof, or a pharmaceutically acceptable salt thereof.

The invention further includes a pharmaceutical composition including a compound of any of formulas I, II or III as provided above, or a pharmaceutically acceptable salt thereof, and a pharmaceutically acceptable carrier. The pharmaceutical composition may further include at least one additional active pharmaceutical agent.

The invention further provides a method of treating a patient with a disease, disorder, condition or syndrome responsive to modulation of a melanocortin receptor, comprising administration to the patient of a pharmaceutically effective amount of the pharmaceutical composition. The disease, disorder, condition or syndrome responsive to modulation of a melanocortin receptor may include obesity or may include metabolic syndrome. In another aspect, the the disease, disorder, condition or syndrome responsive to modulation of a melanocortin receptor may include any one or more of pro-opiomelanocortin deficiency due to mutations in the POMC gene (POMC heterozygous deficiency obesity), Prader-Willi syndrome, obesity due to MC4r deficiency, leptin receptor deficiency obesity, Bardet Biedl syndrome or Alström syndrome.

The invention further comprises a method for inhibiting food uptake in a mammal, comprising administering a pharmaceutically sufficient amount of a composition comprising a compound of this invention or pharmaceutically acceptable salt thereof, and particularly an MC4r selective agonist or partial agonist. The composition may further comprise a pharmaceutically acceptable carrier. In the method, administering may include administering by any method of administration, including but not limited to oral or systemic administration.

One object of this invention is to provide a melanocortin receptor-specific pharmaceutical for use in treatment of eating disorders.

Another object of this invention is to provide an oral pharmaceutical for use in treatment of melanocortin receptor-specific, and preferably MC4r-specific, mediated disorders, diseases, conditions and syndromes.

Another object is to provide a melanocortin receptor-specific pharmaceutical which is effective by oral administration.

Another object is to provide an oral administration melanocortin receptor-specific pharmaceutical with minimal or no effects on increasing blood pressure and/or decreasing heart rate.

Other objects, advantages and novel features, and the further scope of applicability of this invention, will be set forth in part in the detailed description to follow, and in part will become apparent to those skilled in the art upon examination of the following, or may be learned by practice of this invention. The objects and advantages of this invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention.

DESCRIPTION OF THE PREFERRED EMBODIMENTS

Figure 1:
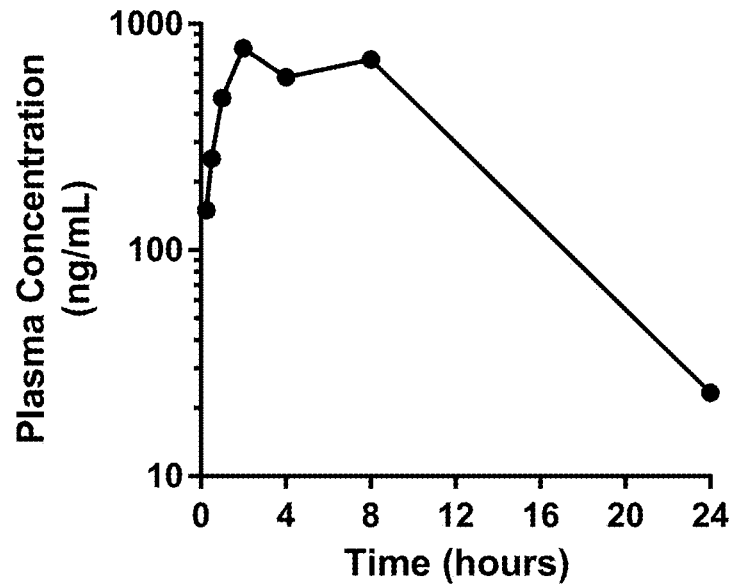
FIG. 1 is a plot of mean plasma concentration (ng/mL) over 24 hours of Compound 7.1 in Sprague-Dawley rats following oral administration of Compound 1 at a dose of 30 mg/kg.

Best Modes for Carrying Out the Invention

1. Definitions

As used herein, the term "alkyl" or "alkyl group" means a saturated unbranched or branched hydrocarbon chain. $(C_1-C_6)$ alkyl means an alkyl having from 1 to 6 carbon atoms. Non-limiting examples of $(C_1-C_6)$ alkyl groups include methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1-pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, and hexyl. Alkyl includes longer alkyl groups, such as heptyl and octyl. An alkyl group can be unsubstituted or optionally substituted with one or two suitable substituents.

As used herein, the term "alkenyl" or "alkenyl group" means an unbranched or branched hydrocarbon chain having one or more double bonds therein (i.e., comprising an alkene or olefin). The double bond of an alkenyl group can be unconjugated or conjugated to another unsaturated group. Suitable alkenyl groups include, but are not limited to $(C_2-C_6)$ alkenyl groups, such as vinyl, allyl, butenyl, pentenyl, hexenyl, butadienyl, pentadienyl, hexadienyl, 2-ethylhexenyl, 2-propyl-2-butenyl, 4-(2-methyl-3-butene)-pentenyl. An alkenyl group can be unsubstituted or optionally substituted with one or two suitable substituents.

As used herein, the term "alkynyl" or "alkynyl group" means an unbranched or branched hydrocarbon chain having one or more triple bonds therein. The triple bond of an alkynyl group can be unconjugated or conjugated to another unsaturated group. Suitable alkynyl groups include, but are not limited to, $(C_2-C_6)$ alkynyl groups, such as ethynyl, propynyl, butynyl, pentynyl, hexynyl, methylpropynyl, 4-methyl-1-butynyl, 4-propyl-2-pentynyl, and 4-butyl-2-hexynyl. An alkynyl group can be unsubstituted or optionally substituted with one or two suitable substituents.

As used herein, the term "aralkyl" means a radical —$R^aR^b$ where $R^a$ is an alkylene (a bivalent alkyl) group and $R^b$ is an aryl group as defined herein. Examples of aralkyl groups include benzyl, phenylethyl, 3-(3-chlorophenyl)-2-methylpentyl, and the like.

As used herein, the term "aryl" or "aryl group" means a monocyclic or polycyclic (e.g., bicyclic) aromatic ring system comprising carbon and hydrogen atoms. The term "aryl" also includes polycyclic aromatic ring systems wherein at least one ring is aromatic and one or more rings are non-aromatic (including saturated or partially saturated rings). Non-limited examples include phenyl, tolyl, anthacenyl, fluorenyl, indenyl, azulenyl, naphthyl, 1-naphthyl, 2-naphthyl, and biphenyl as well as benzo-fused carbocyclic moieties such as 5,6,7,8-tetrahydronaphthyl. An aryl group can be unsubstituted or optionally substituted with one or more suitable substituents as defined below. An aryl group may be fused to a cycloalkyl group, fused to another aryl group, fused to a heteroaryl group, or fused to a heterocycloalkyl group. Preferred aryl groups include, but are not limited to, monocyclic or bicyclic aromatic hydrocarbon radicals of 6 to 12 ring atoms, and optionally substituted independently with one or more substituents selected from alkyl, haloalkyl, cycloalkyl, alkoxy, alkythio, halo, nitro, acyl, cyano, aryl, alkylaryl, aryloxy, amino, monosubstituted amino, disubstituted amino, sulfonamide, hydroxy, carboxy, or alkoxy-carbonyl.

As used herein, the term "heteroaryl" or "heteroaryl group" means a monocyclic or polycyclic aromatic ring comprising carbon atoms, hydrogen atoms, and one or more heteroatoms, preferably 1 to 4 heteroatoms, independently selected from nitrogen, oxygen, and sulfur. Non-limiting examples of heteroaryl groups include pyridyl, pyridazinyl, pyrazyl, indolyl, triazinyl, pyrrolyl, pyrazolyl, imidazolyl, (1,2,3,)-triazolyl, (1,2,4)-triazolyl, pyrazinyl, pyrimidinyl, tetrazolyl, furyl, thienyl, isoxazolyl, thiazolyl, thiadiazolyl, furyl, phienyl, isoxazolyl, oxazolyl, pyrazolyl, tetrazolyl, triazolyl, oxadiazolyl, thiadiazolyl, isoxazolyl, triazinyl, and pyrazinyl. Bicyclic heteroaromatic rings include, but are not limited to, benzothiadiazolyl, indolyl, benzothiophenyl, benzofuryl, benzimidazolyl, benzisoxazolyl, benzothiazolyl, quinolinyl, benzotriazolyl, benzoxazolyl, isoquinolinyl, purinyl, furopyridinyl and thienopyridinyl. A heteroaryl can be unsubstituted or optionally substituted with one or more suitable substituents as defined below. A heteroaryl group optionally may be fused to another heteroaryl group, fused to an aryl group, fused to a cycloalkyl group, or fused to a heterocycloalkyl group.

As used herein, the term "cycloalkyl" or "cycloalkyl group" means a monocyclic or polycyclic saturated ring comprising carbon and hydrogen atoms and having no carbon-carbon multiple bonds. Examples of cycloalkyl groups include, but are not limited to, ($C_3$-$C_7$) cycloalkyl groups, such as cyclopropyl, cyclobutyl, cyclopentyl, cyclohexyl, and cycloheptyl, and saturated cyclic and bicyclic terpenes. A cycloalkyl group can be unsubstituted or optionally substituted with one or more suitable substituents as defined below. A cycloalkyl group optionally may be fused to another cycloalkyl group, fused to an aryl group, fused to a heteroaryl group, or fused to a heterocycloalkyl group.

As used herein, the term "heterocycloalkyl" or "heterocycloalkyl group" means a monocyclic or polycyclic ring comprising carbon and hydrogen atoms and at least one heteroatom, preferably, 1 to 3 heteroatoms selected from nitrogen, oxygen, and sulfur. A heterocycloalkyl group may be fused to an aryl or heteroaryl group. Examples of heterocycloalkyl groups include, but are not limited to, pyrrolidinyl, pyrrolidino, piperidinyl, piperidino, piperazinyl, piperazino, morpholinyl, morpholino, thiomorpholinyl, thiomorpholino, and pyranyl. A heterocycloalkyl group can be unsubstituted or optionally substituted with one or more suitable substituents as defined below. A heterocycloalkyl group optionally may be fused to a cycloalkyl group, fused to an aryl group, fused to a heteroaryl group, or fused to another heterocycloalkyl group. For example, a heterocycloalkyl group can be fused to or substituted with an aryl group or heteroaryl group, for example, but not limited to, 1,2,3,4-tetrahydroisoquinolinyl and 1,2,3,4-tetrahydroquinolinyl, tetrahydronaphthyridinyl, phenylpiperidinyl, and piperidinylpyridinyl. A heterocycloalkyl group may be a monocyclic or bicyclic ring, such as a monocyclic ring comprising from 3 to 6 carbon atoms and from 1 to 3 heteroatoms, referred to herein as ($C_3$-$C_6$) heterocycloalkyl. A heterocycloalkyl group may also be fused to or substituted with an aryl group or a heteroaryl group.

As used herein, the term "alkoxy" means an —O-alkyl group, wherein alkyl is as defined above. An alkoxy group can be unsubstituted or optionally substituted with one or two suitable substituents. Preferably, the alkyl chain of an alkyloxy group is from 1 to 6 carbon atoms in length, referred to herein as "($C_1$-$C_6$) alkoxy".

As used herein, the term "aryloxy" means an —O-aryl group, wherein aryl is as defined above. An aryloxy group can be unsubstituted or optionally substituted with one or two suitable substituents. Preferably, the aryl ring of an aryloxy group is a monocyclic ring, wherein the ring comprises 6 carbon atoms, referred to herein as "($C_6$)aryloxy".

As used herein, the term "carbamoyl" group means the radical —C(=O)N(R')$_2$, wherein R' is chosen from the group consisting of hydrogen, alkyl, and aryl.

As used herein, a "carbonyl" group means a divalent group of the formula C(=O).

As used herein, an "oxo" group means a group of the formula (=O).

As used herein, the term "acyl" means a group R—C (=O)—, where R is an organic group, including but not limited to a $C_1$ to $C_7$ alkyl. An example is the acetyl group $CH_3$—C(=O)—, referred to herein sometimes as "Ac". A moiety is "acylated" when an aryl, alkyl or substituted alkyl group as defined above is bonded through one or more carbonyl {—(C=O)—} groups.

As used herein, an "amide" means compounds that have a trivalent nitrogen attached to a carbonyl group (—C (=O)—NH$_2$), such as for example methylamide, ethylamide, propylamide, and the like.

As used herein, an "amine" means compounds that contain an amino group (—NH$_2$), monosubstituted amino group (—NHR) or disubstituted amino group (—NRR), where each R is independently a suitable substituent.

As used herein a "nitrile" means compounds that are carboxylic acid derivatives and contain a (—C≡N) group bound to an organic group.

As used herein, the term "halogen" means fluorine, chlorine, bromine, or iodine. Correspondingly, the meaning of the terms "halo" and "Hal" encompass fluoro, chloro, bromo, and iodo.

As used herein, the term "sulfonamide" means compounds of the formula —R—S(=O)$_2$—NH$_2$, where R any organic group, including but not limited to alkyl, and where sulfonamide is a suitable substituent, where R is a portion of the substituted group.

As used herein, the term "sulfonyl" means compounds of the formula —R—S(=O)$_2$—R', and where sulfonyl is a suitable substituent, where R is a portion of the substituted group and R' is hydrogen or an organic group including but not limited to alkyl, O-alkyl, aryl, alkenyl or aralkyl.

As used herein, the term "urea" means compounds of the formula formula —R—C(=O)—O—R', and where urea is a suitable substituent, where R is a portion of the substituted group and where R' is hydrogen or an organic group including but not limited to alkyl, aryl, alkenyl or aralkyl.

As used herein, the abbreviation ("PG") or term "protecting group" means a nitrogen protecting group that replaces an amino hydrogen for the purpose of protecting against side reactions and degradation during a reaction sequence. Nitrogen protecting groups useful in the invention include nitrogen protecting groups well known in the synthetic arts, including, but not limited to, Boc, Fmoc, 2-chlorobenzyloxycarbonyl, alloc, benzyloxycarbonyl (Z), 2-(4-biphenylyl)propyl-2-oxycarbonyl (Bpoc), 1-adamantyloxycarbonyl, triphenylmethyl (trityl), and toluene sulphonyl.

As used herein, the term "suitable substituent" means a group that does not nullify the synthetic, therapeutic or pharmaceutical utility of the compounds of the invention or the intermediates useful for preparing them. Examples of suitable substituents include, but are not limited to: alkyl; haloalkyl; cycloalkyl; alkoxy; alkythio; halo; nitro; acyl; cyano; aryl; alkylaryl; aryloxy; amino; monosubstituted amino; disubstituted amino; carbamoyl, urea; sulfonamide; sulfonyl; oxo, hydroxyl; carboxy; alkoxy-carbonyl; alkenyl; alkynyl; heteroaryl; heterocycloalkyl; O-alkenyl; O-alkynyl; oxo; $CF_3$; $NO_2$; $NH_2$; NH(alkyl); N(alkyl)$_2$; NH(aryl); N(aryl)$_2$; C(=O)NH$_2$; C(=O)NH(alkyl); C(=O)N(alkyl)$_2$; C(=O)NH(aryl); C(=O)N(aryl)$_2$; OC(=O)NH$_2$; C(=O)NH(heteroaryl); C(=O)N(heteroaryl)$_2$; C(=O)NH(aralkyl); C(=O)N(aralkyl)$_2$; OC(=O)NH(alkyl); OC(=O)N(alkyl)$_2$; OC(=O)NH(aryl); OC(=O)N(aryl)$_2$; OC(=O)NH(aralkyl); OC(=O)N(aralkyl)$_2$; C(=O)(alkyl); C(=O)(aryl); C(=O)(aralkyl); C(=O)O(alkyl); C(=O)O(aryl); C(=O)O(aralkyl); OC(=O)(alkyl); OC(=O)(aryl); OC(=O)(aralkyl); OC(=O)O(alkyl); OC(=O)O(aryl); OC(=O)O(aralkyl); S-alkyl; S-alkenyl; S-alkynyl; S-aryl; S(=O)$_2$-alkyl; S(=O)$_2$—O-alkyl; S(=O)$_2$-alkenyl; S(=O)$_2$-aralkyl; and S(=O)$_2$-aryl. One of skill in art can readily choose a suitable substituent based on the synthesis, stability and pharmacological activity of the compound of the invention.

The term "composition", as in pharmaceutical composition, is intended to encompass a product comprising the active ingredient(s), and the inert ingredient(s) that make up the carrier, as well as any product which results, directly or indirectly, from combination, complexation or aggregation of any two or more of the ingredients, or from dissociation of one or more of the ingredients, or from other types of reactions or interactions of one or more of the ingredients. Accordingly, the pharmaceutical compositions of this invention encompass any composition made by admixing a compound of this invention and a pharmaceutically acceptable carrier.

The term "$EC_{50}$" is intended to include the molar concentration of an agonist, including a partial agonist, which produced 50% of the maximum possible response for that agonist or partial agonist. By way of example, a compound which, at a concentration of 72 nM, produces 50% of the maximum possible response for that compound as determined in a cAMP assay, has an $EC_{50}$ of 72 nM. Unless otherwise specified, the molar concentration associated with an $EC_{50}$ determination is in nanomoles (nM).

The term "Ki (nM)" is intended to include the equilibrium receptor binding affinity representing the molar concentration of a competing compound that binds to half the binding sites of a receptor at equilibrium in the absence of a competitor. In general, the Ki is inversely correlated to the affinity of the compound for the receptor, such that if the Ki is low, the affinity is high. Ki may be determined using the equation of Cheng and Prusoff (Cheng Y., Prusoff W. H., *Biochem. Pharmacol.* 22: 3099-3108, 1973):

$$Ki = \frac{IC_{50}}{1 + \frac{[ligand]}{K_d}}$$

where "ligand" is the concentration of ligand, which may be a radioligand, and $K_d$ is an inverse measure of receptor affinity which produces 50% receptor occupancy. Unless otherwise specified, the molar concentration associated with a Ki determination is nM. $IC_{50}$ is the concentration of ligand at which 50% of receptor-bound radioligand or other ligand is displaced from the receptor sites in a competitive receptor binding displacement assay.

By "relative efficacy" is meant the maximal functional activity achievable by a compound in a specified melanocortin receptor expressing cell system, such as the maximal stimulation of adenylyl cyclase. The maximal stimulation achieved by α-MSH or NDP-α-MSH is designated as an intrinsic activity of 1.0 (or 100%) and a compound capable of stimulating half the maximal activity that of α-MSH or NDP-α-MSH is designated as having an intrinsic activity of 0.5 (or 50%). A compound of this invention that under assay conditions described herein has an intrinsic activity of 0.7 (70%) or higher is classified as an agonist, a compound with intrinsic activity between 0.1 (10%) and 0.7 (70%) is classified as a partial agonist, and a compound with intrinsic activity below 0.1 (10%) is classified as inactive or having no intrinsic activity. In one aspect, the cyclic peptides of the present invention may generally be characterized as a partial agonist at MC4r with respect to α-MSH or NDP-α-MSH in a human MC4r expression system approximating maximal physiologic receptor densities.

The terms "treat," "treating" and "treatment," as used herein, contemplate an action that occurs while a patient is suffering from the specified disease or disorder, which reduces the severity of the disease or disorder.

As used herein, the term "pharmaceutically effective amount" means the amount of a compound of the invention that will elicit a biological or medical response in the mammal that is being treated by a medical doctor or other clinician.

As used herein, the term "prophylactically effective" or "preventive" means the amount of a compound of the invention that will prevent or inhibit affliction or mitigate affliction of a mammal with a medical condition that a medical doctor or other clinician is trying to prevent, inhibit, or mitigate before a patient begins to suffer from the specified disease or disorder.

The term "pharmaceutically acceptable salt(s)", as used herein includes salts prepared from pharmaceutically acceptable non-toxic inorganic or organic bases or acids, thereby constituting pharmaceutically acceptable acid and base addition salts (see *Handbook of Pharmaceutical Salts: Properties, Selection and Use*, P. H. Stahl, P. G. Wermuth, IUPAC, Wiley-VCH, 2002). Acid addition salts are formed from inorganic or organic acids. Examples of suitable non-toxic acid addition salts are acetate, adipate, aspartate, benzoate, besylate, bicarbonate/carbonate, bisulphate/sulphate, borate, camsylate, citrate, cyclamate, edisylate, esylate, formate, fumarate, gluceptate, gluconate, glucuronate, hexafluorophosphate, hibenzate, hydrochloride/chloride, hydrobromide/bromide, hydroiodide/iodide, isethionate, lactate, malate, maleate, malonate, mesylate, methylsulphate, naphthylate, 2-napsylate, nicotinate, nitrate, orotate, oxalate, palmitate, pamoate, phosphate/hydrogen phosphate/dihydrogen phosphate, pyroglutamate, saccharate, stearate, succinate, tannate, tartrate, tosylate, trifluoroacetate and xinofoate salts. Hemisalts of the acids may also be formed, for example, hemisulphate. Base-addition salts are formed from inorganic or organic bases. Examples of suitable non-toxic base-addition salts are salts derived from aluminum, ammonium, calcium, copper, ferric, ferrous, lithium, magnesium, manganic salts, manganous, potassium, sodium, zinc, primary, secondary, and tertiary amines, substituted amines including naturally occurring substituted amines, cyclic amines, and basic ion exchange resins, such as arginine, betaine, caffeine, choline, N,N'-dibenzylethylenediamine, diethylamine, 2-diethylaminoethanol, 2-dimethylaminoethanol, ethanolamine, ethylenediamine, N-ethyl-morpholine, N-ethylpiperidine, glucamine, glucosamine, histidine, hydrabamine, isopropylamine, lysine, methylglucamine, morpholine, piperazine, piperidine, polyamine resins, procaine, purines, theobromine, TEA, trimethylamine, tripropylamine, and tromethamine.

The chemical naming protocol and structure diagrams used herein employ and rely on the chemical naming features as utilized by the BIOVIA Draw 2018 program (Dassault Systemes), but other comparable programs, such as ChemDraw programs (available from Perkin Elmer), may similarly be employed. In general, structure diagrams do not depict hydrogen atoms other than on heteroatoms, in terminal groups and other special circumstances.

2. Isometric Purity, Prodrugs and Isotopically-Substituted Compounds

Isomeric Purity and Isolation. The compounds of the invention can contain one or more chiral centers and/or double bonds and, therefore, exist as stereoisomers, such as double-bond isomers (i.e., cis-trans isomers or geometric isomers), enantiomers (optical isomers), or diastereomers. According to the invention, the chemical structures depicted herein, and therefore the compounds of the invention, encompass the racemic form of compounds as well as all enantiomers and stereoisomers, that is, both the stereomerically pure form (e.g., geometrically pure, enantiomerically pure, or diastereomerically pure) and enantiomeric and stereoisomeric mixtures.

A compound is considered optically active or enantiomerically pure (i.e., substantially the R-form or substantially the S-form) with respect to a chiral center when the compound is about 90% ee (enantiomeric excess) or greater, preferably, equal to or greater than 95% ee with respect to a particular chiral center. A compound of the invention is considered to be in enantiomerically enriched form when the compound has an enantiomeric excess of greater than about 80% ee, preferably greater than about 85% ee. As used herein, a racemic mixture means about 50% of one enantiomer and about 50% of its corresponding enantiomer relative to all chiral centers in the molecule. Thus, the invention encompasses all enantiomerically pure, enantiomerically enriched, and racemic mixtures of compounds of the invention.

Enantiomeric and stereoisomeric mixtures can be resolved into their component enantiomers or stereoisomers by well known methods, such as chiral-phase gas chromatography, chiral-phase high performance liquid chromatography, crystallizing the compound as a chiral salt complex, or crystallizing the compound in a chiral solvent. Enantiomers and stereoisomers can also be obtained from stereomerically- or enantiomerically-pure intermediates, reagents, and catalysts by well known asymmetric synthetic methods.

The compounds of the invention also include, where possible, all tautomeric isomers thereof, such as prototropic tautomerism (e.g. hydroxypyridine-pyridone, ketone-enol, amide-imidic acid, amine-imine), annular tautomerism, ring-chain tautomerism and valence tautomerism.

Prodrugs. The invention is further intended to include prodrugs of the compounds of the invention, which on administration undergo chemical conversion by metabolic processes before becoming active pharmacological compounds. In general, such prodrugs will be functional derivatives of compounds of the invention, which are readily convertible in vivo into a compound of formula (I).

Prodrugs are any covalently bonded compounds, which release the active parent compound drug of formula (I) in vivo. Conventional procedures for the selection and preparation of suitable prodrug derivatives are described, for example, in *Design of Prodrugs*, ed. H. Bundgaard, Elsevier, 1985 and Rautio, J., et al., "Prodrugs: design and clinical applications," *Nat. Rev. Drug Disc.* 7:255-270 (2008). Typical examples of prodrugs have biologically labile protecting groups on a functional moiety, such as for example by esterification of hydroxyl, carboxyl or amino functions. Broadly speaking, prodrugs include compounds that can be oxidized, reduced, aminated, deaminated, hydroxylated, dehydroxylated, hydrolyzed, dehydrolyzed, alkylated, dealkylated, acylated, deacylated, phosphorylated or dephosphorylated to produce an active parent drug of formula (I) in vivo.

Isotopically-Substituted Compounds. The subject invention also includes compounds which are identical to those recited in formula (I), but for the fact that one or more atoms depicted in formula (I) are replaced by an atom having an atomic mass or mass number different from the atomic mass or mass number usually found in nature. Examples of isotopes that can be incorporated into compounds of the invention include isotopes of hydrogen, carbon, nitrogen, oxygen and fluorine, such as $^2$H, $^3$H, $^{11}$C, $^{13}$C, $^{14}$C, $^{15}$N, $^{18}$O, $^{17}$O or $^{19}$F. Compounds of this invention and pharmaceutically acceptable salts or solvates of said compounds which contain the aforementioned isotopes and/or other isotopes of other atoms are within the scope of this invention. Certain isotopically-labeled compounds of this invention, for example those into which radioactive isotopes such as $^3$H and $^{14}$C are incorporated, may have use in a variety of assays, such as drug and/or substrate tissue distribution assays. Substitution with heavier isotopes, such as substitution of one or more hydrogen atoms with deuterium ($^2$H), can provide pharmacological advantages in some instances, including increased metabolic stability. Isotopically labeled compounds of formula (I) can generally be prepared by substituting an isotopically labeled reagent for a non-isotopically labeled reagent.

3. Formulation and Use of Compounds of the Invention

Compounds of the invention can be used for both medical applications and animal husbandry or veterinary applications. Typically, the compound, or a pharmaceutical composition including the compound, is used in humans, but may also be used in other mammals. The term "patient" is intended to denote a mammalian individual and is so used throughout the specification and in the claims. The primary applications of this invention involve human patients, but this invention may be applied to laboratory, farm, zoo, wildlife, pet, sport or other animals.

The compounds disclosed herein, or made by methods disclosed herein, may be used for the treatment of any condition, syndrome or disease, and in particular for any condition, syndrome or disease for which a melanocortin receptor-specific molecule has some efficacy. The compounds disclosed herein, or made by methods disclosed herein, can have one or more advantages relative to melanocortin receptor-specific peptides, including but not limited to advantages such as increased resistance to enzymatic degradation, increased circulation half life, increased bioavailability, increased efficacy, increased specificity, prolonged duration of effect and combinations of the foregoing.

Salt Form of Compounds. The compounds of this invention may be in the form of any pharmaceutically acceptable salt. The pharmaceutically acceptable salts may be salts prepared from pharmaceutically acceptable non-toxic bases or acids including inorganic or organic bases and inorganic or organic acids. Salts derived from inorganic bases include salts of aluminum, ammonium, calcium, copper, ferric, ferrous, lithium, magnesium, manganic, manganous, potassium, sodium, zinc, and the like. Particularly preferred are the ammonium, calcium, lithium, magnesium, potassium, and sodium salts. Salts derived from pharmaceutically acceptable organic non-toxic bases include salts of primary, secondary, and tertiary amines, substituted amines including naturally occurring substituted amines, cyclic amines, and basic ion exchange resins, such as arginine, betaine, caffeine, choline, N,N'-dibenzylethylenediamine, diethylamine, 2-diethylaminoethanol, 2-dimethylaminoethanol, ethanolamine, ethylenediamine, N-ethyl-morpholine, N-ethylpiperidine, glucamine, glucosamine, histidine, hydrabamine, isopropylamine, lysine, methylglucamine, morpholine, piperazine, piperidine, polyamine resins, procaine, purines, theobromine, triethylamine, trimethylamine, tripropylamine, tromethamine, and the like.

When the compound of this invention is basic, acid addition salts may be prepared from pharmaceutically acceptable non-toxic acids, including inorganic and organic acids. Such acids include acetic, benzenesulfonic, benzoic, camphorsulfonic, carboxylic, citric, ethanesulfonic, formic, fumaric, gluconic, glutamic, hydrobromic, hydrochloric, isethionic, lactic, maleic, malic, mandelic, methanesulfonic, malonic, mucic, nitric, pamoic, pantothenic, phosphoric, propionic, succinic, sulfuric, tartaric, p-toluenesulfonic acid, trifluoroacetic acid, and the like. Acid addition salts of the compound of this invention are prepared in a suitable solvent from the compound and an excess of an acid, such as hydrochloric, hydrobromic, sulfuric, phosphoric, acetic, trifluoroacetic, citric, tartaric, maleic, succinic or methanesulfonic acid. The acetate salt form is especially useful. Where the compound of embodiments of this invention include an acidic moiety, suitable pharmaceutically acceptable salts may include alkali metal salts, such as sodium or potassium salts, or alkaline earth metal salts, such as calcium or magnesium salts.

Pharmaceutical Formulations and Compositions. An embodiment of this invention provides an oral or enteral pharmaceutical formulation that includes a compound of this invention and one or more stabilizing agents, preservatives, solubilizing agents, bulking agents, wetting and solubility enhancing agents, buffering agents, and other excipients.

In one aspect either immediate release or modified release formulations, comprising a compound of this invention, are employed. The modified release formulations may be an extended release formulation or a delayed released formulation or may be a modified release formulation that provides a pulsatile release of a compound of this invention.

Because of their ease of administration, tablets and capsules represent an advantageous oral dosage unit form. If desired, a composition including a compound of this invention may be coated by standard aqueous or nonaqueous techniques. The amount of active compound in such therapeutically useful compositions is such that an effective dosage will be obtained.

One embodiment of the invention provides a dosage form comprising a pharmaceutical formulation including a compound of this invention, where the dosage form is selected from tablets, mini tablets, capsules, beads, granules, powders, caplets, troches, sachets, cachets, pouches, gums, sprinkles, solutions, suspensions, and buccal preparations. The tablets may be osmotic tablets, matrix tablets, bi- and multilayer tablets, fast disintegrating tablets and other type of tablets commonly used in the art. The formulation may be also presented in the form of pellets in a capsule, where the capsule may be swallowed whole or can be opened and the pellets sprinkled on to soft food or in a liquid and then swallowed. The dosage form may further comprise components such as starches, sugars, microcrystalline cellulose, diluents, granulating agents, lubricants, binders, disintegrating agents and the like employed in oral solid preparations.

Any of a variety of enteric and drug release formulations and coatings may further be employed with the selected dosage form, such as immediate release, delayed release or sustained release formulations and coatings. For example, poly(meth)acrylate chemistry, such as Eudragit® polymers, may be employed to yield the desire release profile. For coatings, such as enteric coatings, various Eudragit® polymers may be employed to provide gastrointestinal resistance, pH-controlled drug release, gastrointestinal targeting, and the like.

Bulking agents may make up the largest quantity of the dosage form, and include agents such as lactose anhydrous or lactose monohydrate, glyceryl behenate, hypromellose, ascorbic acid, benzoic acid, gelatin, carbomer, low moisture microcrystalline cellulose, colloidal silicon dioxide, dextrates (anhydrous), dextrose (anhydrous), maltol, fructose, glyceryl palmitostearate, glyceryl monostearate, guar gum, lactitol (anhydrous), magnesium carbonate, maltitol, maltose, mannitol, polyethylene glucol, polyethylene oxide, sodium citrate sorbitol, sucrose, compressible sugar, confectioner's sugar, xylitol and the like.

The selected dosage form, such as tablets, pills, capsules, and the like, may contain a binder such as gum tragacanth, acacia, corn starch or gelatin; excipients such as dicalcium phosphate; a disintegrating agent such as corn starch, potato starch or alginic acid; a lubricant such as magnesium stearate; and a sweetening agent such as sucrose, lactose or saccharin. When a dosage unit form is a capsule, it may contain, in addition to materials of the above type, a liquid carrier such as a fatty oil.

Various other materials may be utilized as coatings or to modify the physical form of the dosage unit. For instance, tablets may be coated with shellac, sugar or both. A syrup or elixir may contain, in addition to the active ingredient, sucrose as a sweetening agent, methyl and propylparabens as preservatives, a dye and a flavoring such as cherry or orange flavor.

Compounds of this invention may also be administered parenterally. Solutions or suspensions of active compounds can be prepared in water suitably mixed with a surfactant such as hydroxy-propylcellulose. Dispersions can also be prepared in glycerol, liquid polyethylene glycols and mixtures thereof in oils. These preparations may optionally contain a preservative to prevent the growth of microorganisms. Lyophilized single unit formulations may also be employed, such as are reconstituted with saline prior to administration, and thus do not require a preservative.

The pharmaceutical forms suitable for injectable use include sterile aqueous solutions or dispersions and sterile powders, such as lyophilized formulations, for the extemporaneous preparation of sterile injectable solutions or dispersions. In all cases, the form must be sterile and must be fluid to the extent that it may be administered by syringe. The form must be stable under the conditions of manufacture and storage and must be preserved against the contaminating action of microorganisms such as bacteria and fungi. The carrier can be a solvent or dispersion medium containing, for example, water, ethanol, a polyol, for example glycerol, propylene glycol or liquid polyethylene glycol, suitable mixtures thereof, and vegetable oils.

The compounds of this invention may in an alternative aspect be therapeutically administered by means of an injection, typically a deep intramuscular injection, such as in the gluteal or deltoid muscle, of a time release injectable formulation. In one embodiment, a compound of this invention is formulated with a PEG, such as poly(ethylene glycol) 3350, and optionally one or more additional excipients and preservatives, including but not limited to excipients such as salts, polysorbate 80, sodium hydroxide or hydrochloric acid to adjust pH, and the like. In another embodiment a compound of this invention is formulated with a poly(ortho ester), which may be an auto-catalyzed poly(ortho ester) with any of a variable percentage of lactic acid in the polymeric backbone, and optionally one or more additional excipients.

In one embodiment poly (D,L-lactide-co-glycolide) polymer (PLGA polymer) is employed, preferably a PLGA polymer with a hydrophilic end group, such as PLGA RG502H from Boehringer Ingelheim, Inc. (Ingelheim, Germany). Such formulations may be made, for example, by combining a compound of this invention in a suitable solvent, such as methanol, with a solution of PLGA in methylene chloride, and adding thereto a continuous phase solution of polyvinyl alcohol under suitable mixing conditions in a reactor. In general, any of a number of injectable and biodegradable polymers, which are preferably also adhesive polymers, may be employed in a time release injectable formulation. The teachings of U.S. Pat. Nos. 4,938,763, 6,432,438, and 6,673,767, and the biodegradable polymers and methods of formulation disclosed therein, are incorporated here by reference. The formulation may be such that an injection is required on a weekly, monthly or other periodic basis, depending on the concentration and amount of compound, the biodegradation rate of the polymer, and other factors known to those of skill in the art. For injection or other liquid administration formulations, water containing at least one or more buffering constituents is preferred, and stabilizing agents, preservatives and solubilizing agents may also be employed. For solid administration formulations, any of a variety of thickening, filler, bulking and carrier additives may be employed, such as starches, sugars, amino acids, fatty acids and the like. For topical administration formulations, any of a variety of creams, ointments, gels, lotions and the like may be employed. For most pharmaceutical formulations, non-active ingredients will constitute the greater part, by weight or volume, of the preparation.

Therapeutically Effective Amount. In general, the actual quantity of compound of this invention administered to a patient will vary between fairly wide ranges depending upon the mode of administration, the formulation used, and the response desired. The dosage for treatment is administration, by any of the foregoing means or any other means known in the art, of an amount sufficient to bring about the desired therapeutic effect. Thus a therapeutically effective amount includes an amount of a compound or pharmaceutical composition of this invention that is sufficient to induce a desired effect.

In general, the compounds of this invention are highly active. For example, for systemic applications the compound can be administered at about 0.01, 0.05, 0.1, 0.5, 1, 5, 10, 50, or 100 mg/kg body weight, depending on the specific compounds selected, the desired therapeutic response, the route of administration, the formulation and other factors known to those of skill in the art. For oral administration, a tablet or capsule containing from about 1 to about 1000 mg of compound is administered once daily, twice daily, three times daily or four times daily. In one aspect, from about 10 to about 1000 mg of the compound of Example 7.1 is administered once or twice daily as a tablet or capsule.

Therapeutic Application. Compounds of this invention that are ligands of MC4r are believed to be useful in treating diseases, disorders and/or conditions responsive to modulation of the MC4r, more particularly activation of the MC4r, i.e. diseases, disorders and/or conditions which would benefit from agonism (including full or partial agonism) at the MC4r, including energy homeostasis and metabolism related (such as diabetes, in particular type 2 diabetes; dyslipidemia; fatty liver; gout; hypercholesterolemia; hypertriglyceridemia; hyperuricacidemia; impaired glucose tolerance; impaired fasting glucose; insulin resistance syndrome; and metabolic syndrome), food intake related (such as hyperphagia; binge eating; bulimia; and compulsive eating) and/or energy balance and body weight related diseases, disorders and/or conditions, more particularly such diseases, disorders and conditions characterized by excess body weight and/or excess food intake. In one aspect, compounds of the invention are utilized to treat conditions relating to various expression or receptor genetic diseases such as pro-opiomelanocortin deficiency due to mutations in the POMC gene (POMC heterozygous deficiency obesity), Prader-Willi syndrome, obesity due to MC4r deficiency, leptin receptor deficiency obesity, leptin deficiency obesity, including congenital leptin deficiency, Bardet Biedl syndrome, Alström syndrome, and various other diseases, conditions, genetic deficiencies, metabolic disorders, and syndromes.

It will be understood that there are medically accepted definitions of obesity and overweight. A patient may be identified by, for example, measuring body mass index (BMI), which is calculated by dividing weight in kilograms by height in metres squared, and comparing the result with the definitions. The recommended classifications for BMI in humans, adopted by the Expert Panel on the Identification, Evaluation and Treatment of Overweight and Obesity in Adults, and endorsed by leading organizations of health professionals, are as follows: underweight<18.5 kg/m$^2$, normal weight 18.5-24.9 kg/m$^2$, overweight 25-29.9 kg/m$^2$, obesity (class 1) 30-34.9 kg/m$^2$, obesity (class 2) 35-39.9 kg/m$^2$, extreme obesity (class 3)≥40 kg/m$^2$ (Practical Guide to the Identification, Evaluation, and Treatment of Overweight and Obesity in Adults, The North American Association for the Study of Obesity (NAASO) and the National Heart, Lung and Blood Institute (NHLBI) 2000). Modifications of this classification may be used for specific ethnic groups. Another alternative for assessing overweight and obesity is by measuring waist circumference. There are several proposed classifications and differences in the cut-offs based on ethnic group. For instance, according to the classification from the International Diabetes Federation, men having waist circumferences above 94 cm (cut off for europids) and women having waist circumferences above 80 cm (cut off for europids) are at higher risk of diabetes, dyslipidemia, hypertension and cardiovascular diseases because of excess abdominal fat. Another classification is based on the recommendation from the Adult Treatment Panel Ill where the recommended cut-offs are 102 cm for men and 88 cm for women. However, the compounds of this invention may also be used for reduction of self-diagnosed overweight and for decreasing the risk of becoming obese due to life style, genetic considerations, heredity and/or other factors. The term "diabetes" includes type 1 diabetes (insulin-dependent diabetes mellitus), latent autoimmune diabetes mellitus of adults (LADA), and type 2 diabetes.

It is believed that compounds of this invention which are MC4r agonists or partial agonists, upon administration to an animal, including man, will reduce food intake, body weight and/or body weight gain in that animal. Without being bound by any theory, it is believed that such compounds of this invention act by modulating appetite and/or satiety, increasing metabolic rate, reducing intake of and/or craving for fat and/or carbohydrates.

Without being bound by any theory, it is also believed that compounds of this invention which are MC4r agonists or partial agonists, act by enhancing glucose tolerance and/or decreasing insulin resistance. It is therefore believed that such compounds of this invention can be useful also for treatment of type 2 diabetes in underweight and normal weight individuals as well as in overweight and obese individuals.

Thus compounds of this invention which are MC4r agonists or partial agonists have utility in attenuating food intake and body weight gain, and for treatment of obesity, diabetes mellitus type 2, metabolic syndrome and related conditions and indications, as well as various expression or receptor genetic diseases such as pro-opiomelanocortin deficiency due to mutations in the POMC gene (POMC heterozygous deficiency obesity), Prader-Willi syndrome, obesity due to MC4r deficiency, leptin receptor deficiency obesity, leptin deficiency obesity, Bardet Biedl syndrome, Alström syndrome, and various other diseases, conditions, genetic deficiencies, metabolic disorders, and syndromes.

MC4r is a part of the leptin-melanocortin pathway, or pro-opiomelanocortin (POMC)-MC4r pathway. Constituent members of this pathway include a wide diversity of proteins, including α-MSH, POMC, leptin and leptin receptors. Certain diseases, conditions and syndromes result from mutations and variations, including genetic defect disorders, associated with or in one or more constituent members of the POMC-MC4r pathway. The compounds of this invention may, as hereafter described, be useful in treatment of diseases, conditions and syndromes resulting from mutations and variations, including genetic defect disorders, associated with or in one or more constituent members of the POMC-MC4r pathway.

The hypothalamic POMC-MC4r pathway is part of the regulatory system modulating feed behavior, appetite and body weight. There are a number of diseases, conditions and syndromes which have been described associated with disruption of the hypothalamic POMC-MC4r pathway which is believed to result from genetic defects or disruptions, include defects or disruptions in genes in the POMC-MC4r pathway. For example, Prader-Willi syndrome manifests in significant hyperphagia and severe obesity, and may include other features and signs, such as learning disabilities, abnormal neurologic function, hypogonadism, short stature and developmental and cognitive delays. The compounds of this invention may, as hereafter described, be useful in treatment of Prader-Willi syndrome, as well as other diseases, conditions and syndromes involving defects or disruptions in genes in the POMC-MC4r pathway.

Compounds of the invention may be utilized and are indicated for the treatment of the obesity and hyperphagia associated with POMC deficiency caused by homozygous or compound heterozygous loss of function mutations in the POMC gene located at chromosome 2, position 23.3. Mutations in the POMC gene that result in complete loss of or that significantly reduce production of the POMC polypeptide lead to no or reduced production of α-MSH. This loss of endogenous α-MSH results in significantly diminished MC4r activity with resulting hyperphagia and obesity. Compounds of this invention may be utilized as a replacement MC4r agonist therapeutic in patients with little or no endogenous α-MSH.

For a variety of diseases, conditions or syndromes associated with disruption of the hypothalamic POMC-MC4r pathway, various genetic and genotyping tests may be employed as part of diagnosis of prospective patients, and determining suitability for use of the compounds of this invention in such prospective patients. By way of example and not limitation, for Prader-Willi syndrome it is possible to utilize genetic testing such as DNA-based methylation testing to ascertain the the loss of active genes in a specific part of chromosome 15, the 15q11-q13 region, specifically deletion of at least the 15q11-q13 region of paternal chromosome 15. Similarly, POMC deficiency may be diagnosed by loss of function mutations in the POMC gene. Thus treatment with a compound of this invention may include various diagnostic and genetic tests to ascertain the presence of a loss of function mutuation or other mutuation in the POMC-MC4r pathway, including but not limited to a loss of function mutuation for Prader-Willi syndrome affecting the 15q11-q13 region, loss of function mutations in the POMC gene, the leptin gene, the leptin receptor gene, and various other genes in the POMC-MC4r pathway.

4. Synthetic Methods for Compounds of the Invention

The following synthetic methods were employed in making compounds of this invention. It is to be understood that the invention and the compounds disclosed herein are not limited to those made by the following methods of synthesis, but that other or alternative methods of synthesis can be employed to make compounds within the scope of this invention.

The following abbreviations are employed in the synthetic schemes, and have the meanings given:
 alloc—allyloxycarbonyl
 Boc—tert-butoxycarbonyl
 cbz—carboxybenzyl
 EDC—1-ethyl-3-(3-dimethyllaminopropyl)carbodiimide hydrochloride
 Fmoc—9H-fluoren-9-ylmethoxycarbonyl
 HATU—2-(1H-7-azabenzotriazol-1-yl)-1,1,3,3-tetramethyl uronium hexafluorophosphate
 HBTU—O-benzotriazole-N,N,N',N'-tetramethyl-uronium-hexafluoro-phosphate PG—Refers to a protecting group, including Fmoc, Boc, cbz or alloc TBTU—O-(benzotriazol-1-yl)-N,N,N',N'-tetramethyl-uronium tetrafluoroborate TFA—trifluoroacetic acid The following exemplifies the synthesis of the compound of Example 7.1 as hereafter described, yielding HCl salt of Example 7.1 with an overall yield of 47.9%. The compounds of Examples 7.2 through 7.11, and other compounds within the scope of the invention, may be made through similar synthetic routes, modified as appropriate to yield the desired compound.

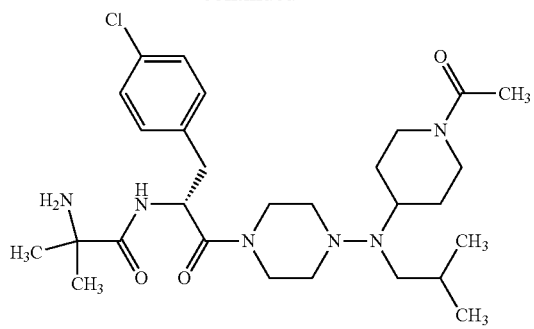

Synthesis of Compound 3: Commercially available 1-t-butyloxycarbonyl-4-amino-piperazine 1 (1.0 g, 4.97 mmol) and N-acetyl-4-piperidone 2 (0.611 mL, 4.97 mmol) were stirred in 30 mL of dichloromethane at room temperature for 30 minutes. To the solution was added 1.68 g of solid sodium triacetoxyborohydride (7.95 mmol) in portions, and the suspension was stirred at room temperature over night. Additional sodium triacetoxyborohydride (500 mg, 2.36 mmol) was added and stirred for 5 hours. The reaction mixture containing product 3 was used directly in the next step.

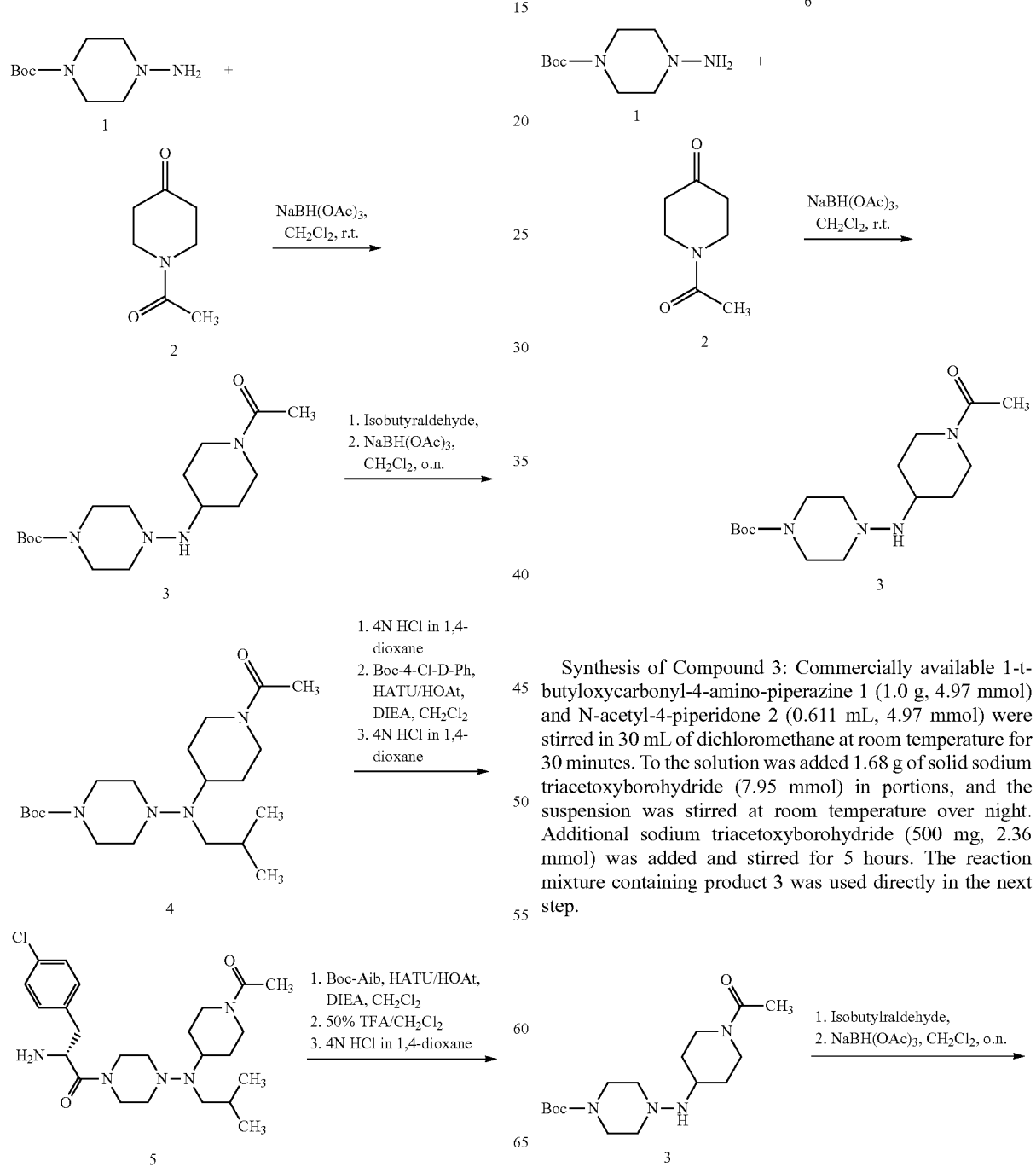

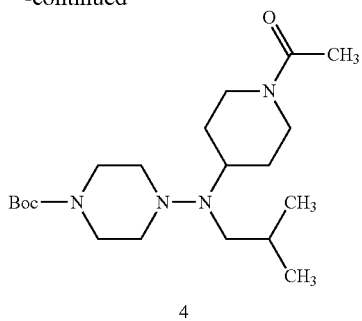

4

Synthesis of Compound 4: To the crude mixture containing compound 3 was added isobutylaldehyde (0.453 mL, 4.97 mmol) and sodium triacetoxyborohydride (1.68 g, 7.95 mmol). The cloudy solution was stirred at room temperature overnight. LC-MS showed an incompleted reaction. Additional isobutylaldehyde (0.2 mL, 2.19 mmol) and sodium triacetoxyborohydride (500 mg, 2.36 mmol) were added, and stirred for 10 hours. LC-MS showed that the reaction was still not completed. More isobutylaldehyde (0.4 mL, 4.38 mmol) and sodium triacetoxyborohydride (500 mg, 2.36 mmol) were added and stirred over night again, to drive the reaction to completion. The mixture was diluted with 50 mL of dichloromethane. The organic layer was washed with saturated sodium bicarbonate solution 2×, dried over sodium sulfate, filtered and concentrated to crude product. The crude was purified by flash column with a gradient of 50% to 100% ethyl acetate in heptane. Pure fractions were pooled and concentrated to 1.54 g of compound 4 as yellow foam (overall yield 81.1%).

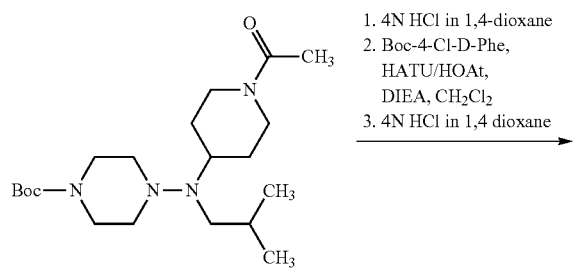

5

Synthesis of Compound 5: Compound 4 (1.54 g, 4.03 mmol) was dissolved in 10 mL of dichloromethane, followed by 20 mL of 4 N HCl solution and 10 mL of methanol. The clear solution was stirred for 2 hours, then evaporated with methanol and dichloromethane twice, and dried under high vacuum before the next step.

The dried intermediate was dissolved in 80 mL of dichloromethane. To this solution was added Boc-4-Cl-D-Phe (1.57 g, 5.24 mmol), N,N-Diisopropylethylamine (DIEA) (1.97 mL, 12.1 mmol), 1-Hydroxy-7-azabenzotriazole (HOAt) (5.49 mmol) and 1-[Bis(dimethylamino)methylene]-1H-1,2,3-triazolo[4,5-b]pyridinium 3-oxid hexafluorophosphate (HATU) (2.14 g, 5.6 mmol). The suspension was stirred at r.t. over night. After dilution with 50 mL of dichloromethane, the organic layer was washed with saturated sodium bicarbonate and concentrated. Crude product was purified on a 40 gram silica gel Isco column utilizing a gradient of 50% to 100% ethyl acetate in heptanes. Purified fractions were pooled and concentrated.

The purified intermediate 5 was dissolved in 5 mL of dichloromethane, followed by 10 mL of 4 N HCl solution and 5 mL of methanol. The clear solution was stirred for 45 minutes, then evaporated with methanol twice, followed by evaporation under high vacuum.

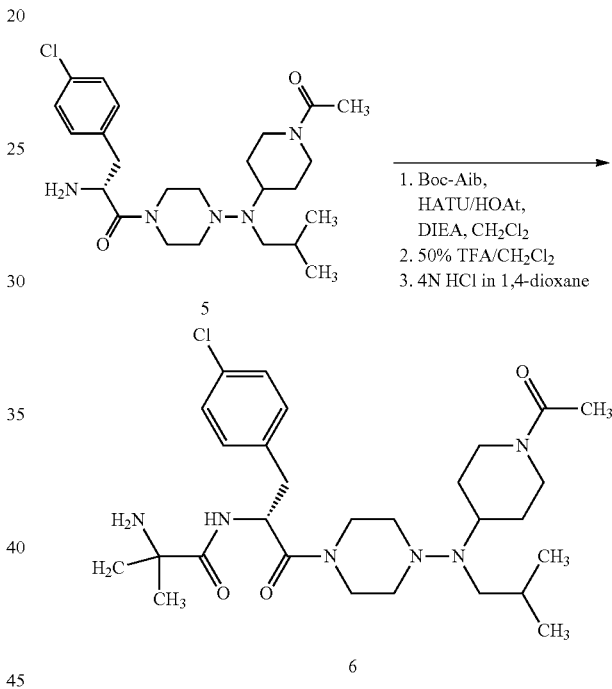

Synthesis of Compound 6: Compound 5 (312 mg, 0.583 mmol) and Boc-Aib (154 mg, 0.758 mmol) were dissolved in 8 mL of dichloromethane, followed by DIEA (0.405 mL, 2.33 mmol) to afford a clear solution. Then HOAt (79 mg, 0.583 mmol) and HATU (332 mg, 0.874 mmol) were added, and stirred at room temperature over night. After dilution with 40 mL of dichloromethane, the organic layer was washed with saturated sodium bicarbonate and concentrated. The crude product was purified by HPLC, and the combined fractions concentrated.

The concentrated intermediate was dissolved in the mixture of 2 mL of TFA and dichloromethane (1:1, v/v), and stirred for 30 minutes. The solvents were removed in vacuo, and the residue was partitioned between dichloromethane and saturated ammonium hydroxide solution. The desired product was extracted from the basic aqueous layer with dichloromethane 4 times. 4N HCl was added to the combined organic layer until thick precipitate formed and the pH was approximately 1. The solvents were removed in vacuo and the residue was dissolved in a mixture of 9 mL of t-butanol and 1 mL of water. The resulting solution was lyophilized to yield 201.53 mg of Compound 6 (the compound of Example 7.1) (yield 59.1%).

Alternate Synthesis with Diverse $R_1$ and $R_5$ Groups.

Any of a variety of $R_5$ groups may be introduced to 3 by utilizing equamolar amounts of $R_5$-aldehyde and 3 in a solvent such as methylene chloride, dichloroethane or tetrahydrofuran and adding NaBH(OAc)$_3$ portionwise (typically at 1.5 times the molar concentration of the $R_5$-aldehyde). $R_5$ may be a $C_1$ to $C_{17}$ linear or branched alkyl, cycloalkyl, or alkylcycloalkyl, or a $C_1$ to $C_7$ acyl group, in each instance optionally substituted with one or more substituents, and when one or more substituents are present, such substituents are the same or different and independently halo, amino, monosubstituted amino, disubstituted amino, hydroxy, or carboxy. The resulting solution is stirred at room temperature for 16 hours, washed with saturated sodium bicarbonate, dried over sodium sulfate and concentrated to yield product.

The $R_5$ group may also be introduced to 3 (1.0 mmol) by the coupling of an organic acid (1.1 mmol), a dehydrating reagent such as TBTU, EDC, HATU or HBTU (1.1 mmol) and an organic base such as N-methylmorpholine or diisopropyl ethyl amine (2.0 mmol) in a solvent such as methylene chloride, tetrahydrofuran or dioxane.

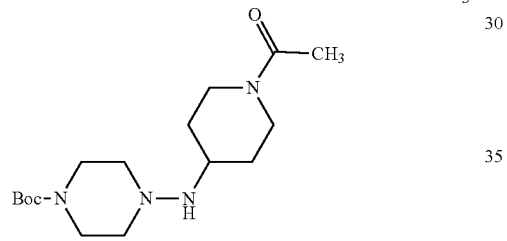

Alternatively, an $R_5$ group may be introduced to 3 by stirring with an activated group (1.2 equivalents), such as an organic acid chloride, isocyanate, chloroformate or sulfonyl chloride (generically $R_1$—X) and excess base such as pyridine, diisopropyl ethyl amine, triethylamine or 2,4 lutidine in a solvent such as methylene chloride, dichloroethane or tetrahydrofuran. Any $R_5$ may be employed; typical $R_5$ groups include methyl, isopropyl, isobutyl, acetyl, sulfonyl, carbamoyl and the like.

By way of example, use of Boc as a PG for piperazine and alloc as a PG for piperidine results, following introduction of the $R_5$ group, in compound 10. Compound 10 is selectively deprotected, such as by removal of the alloc group to yield compound 11. For example, to remove the alloc group compound 11 is treated at room temperature with catalytic tetrakis(triphenylphosphine)palladium in a solvent such as methylene chloride, tetrahydrofuran or dichloroethane in the presence of an excess (10×) of an allyl acceptor scavenger, such as phenylsilane or 1,3-dimethylbarbituric acid. Following addition of the —C(=O)—$R_1$ group and removal of the protecting group PG (such as for example alloc, Boc or cbz), the solution is dried over sodium sulfate and evaporated to give the $R_1$ and $R_5$ substituted 12.

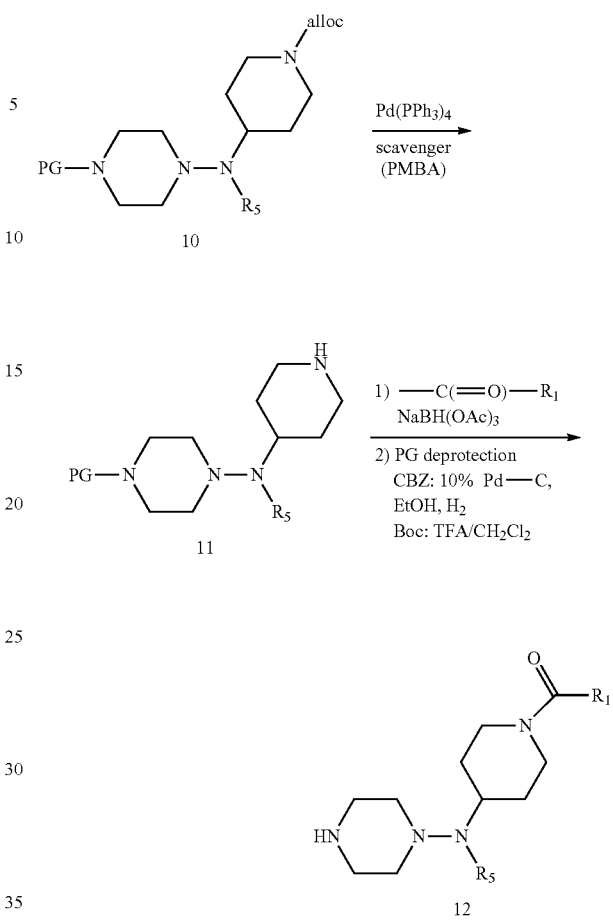

Alternate Synthesis with Diverse $R_{6a}$, $R_{6b}$, $R_2$, $R_3$ and $R_4$ Groups. It is possible and contemplated to either stepwise couple a protected, such as a Boc protection, optionally substituted phenylalanine, where $R_{6a}$ and $R_{6b}$ are permitted substituents, and an α,α-disubstituted amino acid comprising $R_2$, $R_3$ and $R_4$ substituents, to $R_1$ and $R_5$ substituted 12, or to alternatively to couple optionally substituted phenylalanine, where $R_{6a}$ and $R_{6b}$ are permitted substituents, to an α,α-disubstituted amino acid comprising $R_2$, $R_3$ and $R_4$ substituents, and thereafter to couple the resulting compound to $R_1$ and $R_5$ substituted 12.

For stepwise coupling, $R_1$ and $R_5$ substituted 12 (1.0 mmol) is added slower to a stirred mixture of a Boc protected optionally substituted phenylalanine, where $R_{6a}$ and $R_{6b}$ are permitted substituents (1.1 mmol), a a dehydrating reagent such as TBTU, EDC, HATU or HBTU (1.1 mmol) and an organic base such as N-methylmorpholine or diisopropyl ethyl amine (2.0 mmol) in a solvent such as methylene chloride, tetrahydrofuran or dioxane. After stirring for 16 hours the solution is extracted into a solvent such as methylene chloride or ethyl acetate and washed with saturated sodium bicarbonate, dried over sodium sulfate and concentrated. De-protection is accomplished by stirring with excess TFA in solvent such as methylene chloride for one hour followed by evaporation of the solvent. The resulting oil is basified to pH=8 with sodium bicarbonate and extracted into a solvent such as methylene chloride or ethyl acetate. The solution is dried over sodium sulfate and evaporated to yield an oil as compound 13.

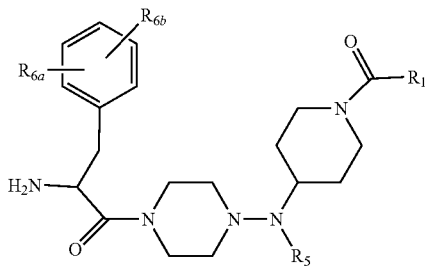

13

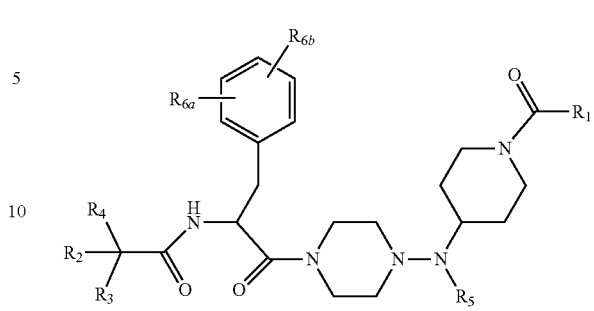

14

Compound 13 (1.0 mmol) is added slowly to a stirred mixture of a protected, such as a Boc-protected, α-disubstituted amino acid comprising $R_2$, $R_3$ and $R_4$ substituents (1.1 mmol), a dehydrating reagent such as TBTU, EDC, HATU or HBTU (1.1 mmol) and an organic base such as N-methylmorpholine or diisopropyl ethyl amine (2.0 mmol) in a solvent such as methylene chloride, tetrahydrofuran or dioxane. After stirring for 16 hours the solution is extracted in a solvent such as methylene chloride or ethyl acetate and washed with saturated sodium bicarbonate, dried over sodium sulfate and concentrated. Deprotection is accomplished by stirring with excess TFA in solvent such as methylene chloride for one hour followed by evaporation of the solvent. The residue is dissolved in an appropriate solvent, such as 35% aqueous methanol, and purified by HPLC to yield compound 14. The resulting compound 14 is purified by HPLC.

$R_{6a}$ and $R_{6b}$ may be optionally substituted with one or more substituents, including specifically substitutents that are the same or different and independently alkyl, haloalkyl, cycloalkyl, alkoxy, alkythio, halo, nitro, acyl, cyano, aryl, alkylaryl, aryloxy, amino, monosubstituted amino, disubstituted amino, sulfonamide, hydroxy, carboxy, or alkoxycarbonyl. As appropriate, reactive substituents may include protecting groups, which are deprotected to yield final product. Protecting groups other than Boc, including specifically alloc, may be employed.

In the foregoing methods and synthetic schemes, any optionally protected and optionally substituted phenylalanine, where $R_{6a}$ and $R_{6b}$ are permitted substituents, may be employed. D-isomer phenylalanine (D-Phe) is preferred, but L-isomer phenylalanine may be employed. Preferred is PG-D-Phe optionally substituted with one or two substitutents, which substituents may be the same or different. Substituents include, but are not limited to, —Cl, —CF$_3$, —CN, —CH$_3$, —OH, —NO$_2$, —F, —Br, —Cl, —I, —OCH$_3$ and the like. Thus side chains of Phe, preferably where Phe is the D-isomer, may include, but are not limited to, the following:

| Abbreviation | Common Name | Side Chain |
|---|---|---|
| Phe(2-CF$_3$) | 2-trifluoromethyl phenylalanine | |
| Phe(2-C(=O)—NH$_2$) | 2-carbamoyl-phenylalanine | |
| Phe(2-Me) | 2-methyl phenylalanine | |

-continued

| Abbreviation | Common Name | Side Chain |
|---|---|---|
| Phe(2-CN) | 2-cyano phenylalanine | 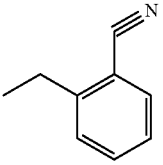 |
| Phe(2-Cl) | 2-chloro phenylalanine | 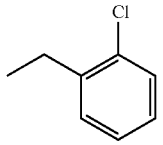 |
| Phe(2,4-diCl) | 2,4-dichloro phenylalanine | 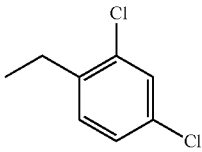 |
| Phe(2,4-diMe) | 2,4-dimethyl phenylalanine | 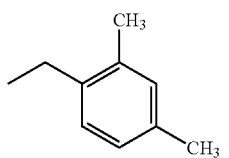 |
| Phe(2-F) | 2-fluoro phenylalanine | 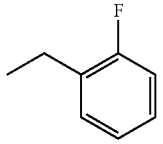 |
| Phe(2-NO$_2$) | 2-nitro phenylalanine | 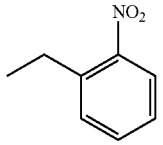 |
| Phe(3-CF$_3$) | 3-trifluoromethyl phenylalanine | 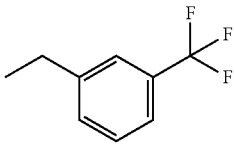 |
| Phe(3-C(=O)—NH$_2$) | 3-carbamoyl-phenylalanine | 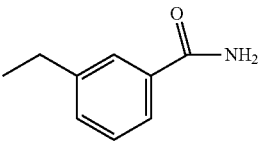 |
| Phe(3-CN) | 3-cyano phenylalanine | 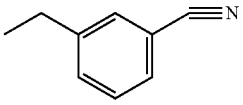 |
| Phe(3-Cl) | 3-chloro phenylalanine | 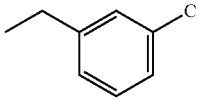 |

| Abbreviation | Common Name | Side Chain |
|---|---|---|
| Phe(3,4-diCl) | 3,4-dichloro phenylalanine | |
| Phe(3-F) | 3,4-fluoro phenylalanine | |
| Phe(3,4-diF) | 3,4-difluoro phenylalanine | |
| Phe(3,5-diF) | 3,5-difluoro phenylalanine | |
| Phe(3-Me) | 3-methyl phenylalanine | |
| Phe(3-NO$_2$) | 3-nitro phenylalanine | |
| Phe(3,4-diOMe) | 3,4-dimethoxy phenylalanine | |
| Phe(4-C(=O)—NH$_2$) | 4-carbamoyl-phenylalanine | |
| Phe(4-Me) | 4-methyl phenylalanine | |
| Phe(4-CF$_3$) | 4-trifluoromethyl phenylalanine | |
| Phe(4-CN) | 4-cyano phenylalanine | |
| Phe(4-Cl) | 4-chloro phenylalanine | |

| Abbreviation | Common Name | Side Chain |
| --- | --- | --- |
| Phe(4-F) | 4-fluoro phenylalanine | |
| Phe(4-NH$_2$) | 4-amino phenylalanine | |
| Phe(4-NO$_2$) | 4-nitro phenylalanine | |
| Phe(4-Ph) | 4-phenyl phenylalanine | |
| Phe(4-OMe) | 4-methoxy phenylalanine | |
| Phe(4-tBu) | 4-tert butyl phenylalanine | |

In the foregoing methods and synthetic schemes, any α,α-disubstituted amino acid may conveniently be employed to provide the $R_2$, $R_3$ and $R_4$ groups. In general, an "α,α-disubstituted amino acid" includes any α-amino acid having a further substituent in the α-position, which substituent may be the same as or different from the side chain moiety of the α-amino acid. For purposes of the specification and claims, either a "substituent" or the "side chain moiety" of an α,α-disubstituted amino acid is referred to as a side chain, such that an α,α-disubstituted amino acid includes two side chains. Suitable substituents, in addition to the side chain moiety of the α-amino acid, include but are not limited to $C_1$ to $C_6$ linear or branched alkyl. Aib is an example of an α,α-disubstituted amino acid. While α,α-disubstituted amino acids can be referred to using conventional L- and D-isomeric references, it is to be understood that such references are for convenience, and that where the substituents at the α-position are different, such amino acid can interchangeably be referred to as an α,α-disubstituted amino acid derived from the L- or D-isomer, as appropriate, of a residue with the designated amino acid side chain moiety. Thus (S)-2-Amino-2-methyl-hexanoic acid can be referred to as either an α,α-disubstituted amino acid derived from L-Nle or as an α,α-disubstituted amino acid derived from D-Ala. Whenever an α,α-disubstituted amino acid is provided, it is to be understood as including all (R) and (S) configurations thereof. The α,α-disubstituted amino acid at position Aaa$^4$ may be any α,α-disubstituted amino acid. By way of example and not limitation, the following are included in the definition of an α,α-disubstituted amino acid which provides $R_2$, $R_3$ and $R_4$ groups.

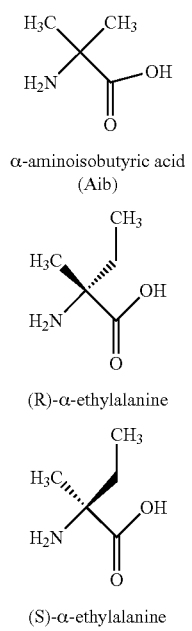

α-aminoisobutyric acid (Aib)

(R)-α-ethylalanine (S)-α-ethylalanine

-continued

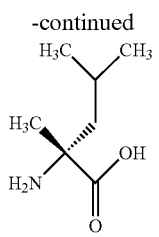
(R)-α-methylleucine

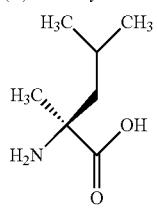
(S)-α-methylleucine

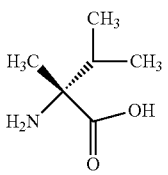
(R)-α-methylvaline

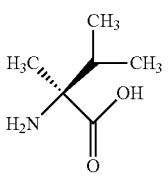
(S)-α-methylvaline

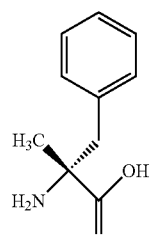
(R)-α-methylphenylalanine

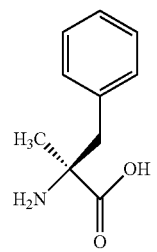
(S)-α-methylphenylalanine

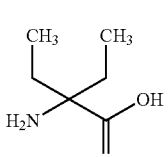
diethylglycine

-continued

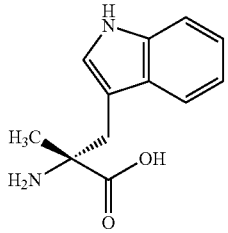
α-methyltrptophan (αMeTrp)

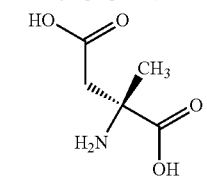
(R)-α-methylaspartic acid

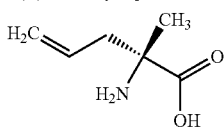
(R)-α-methylalanine

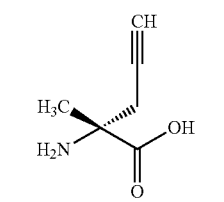
(R)-α-propargylalanine

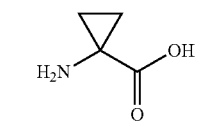
1-aminocyclopropanecarboxylic acid

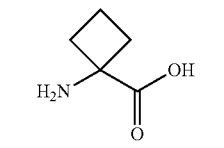
1-aminocyclobutaecarboxylic acid

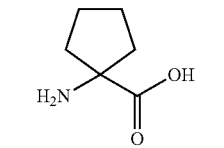
1-aminocyclopentanecarboxylic acid

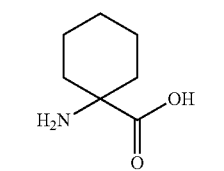
1-aminocyclohexanecarboxylic acid

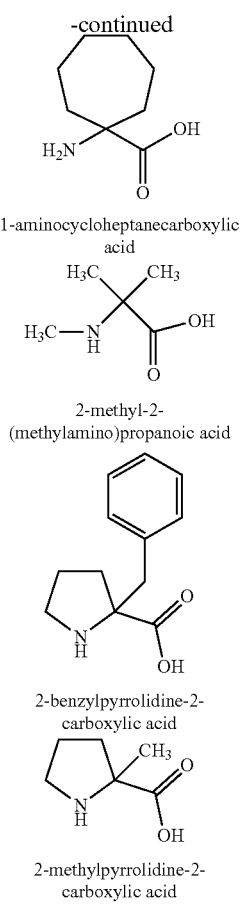

1-aminocycloheptanecarboxylic acid 2-methyl-2-(methylamino)propanoic acid 2-benzylpyrrolidine-2-carboxylic acid 2-methylpyrrolidine-2-carboxylic acid 5. Assay Systems for Compounds Selected compounds are tested in assays to determine binding and functional status and are tested in animal models of feeding behavior as discussed below. The following assays and animal models are employed, with modifications, if any, as discussed in the examples.

Competitive Inhibition Assay Using [$I^{125}$]-NDP-α-MSH. A competitive inhibition binding assay is performed using membrane homogenates prepared from HEK-293 cells that express recombinant hMC1ra, hMC4r, hMC3r, or hMC5r, and from B16-F10 mouse melanoma cells (containing endogenous MC1r). In the examples that follow, all values are for human recombinant receptors unless otherwise noted. Assays are performed in 96 well GF/B Millipore multiscreen filtration plates (MAFB NOB10) pre-coated with 0.5% bovine serum albumin (Fraction V). Membrane homogenates are incubated with 0.2 nM (for hMC4r) 0.4 nM (for MC3r and MC5r) or 0.1 nM (for mouse B16-F10 MC1r or hMC1ra) [$I^{125}$]-NDP-α-MSH (Perkin Elmer) and increasing concentrations of test compounds in buffer containing 25 mM HEPES buffer (pH 7.5) with 100 mM NaCl, 2 mM $CaCl_2$, 2 mM $MgCl_2$, 0.3 mM 1,10-phenanthroline, and 0.2% bovine serum albumin. After incubation for 60 to 90 minutes at 37° C., the assay mixture is filtered and the membranes washed three times with ice-cold buffer. Filters are dried and counted in a gamma counter for bound radioactivity.

Non-specific binding is measured by inhibition of binding of [$I^{125}$]-NDP-α-MSH in the presence of 1 µM NDP-α-MSH. Maximal specific binding (100%) is defined as the difference in radioactivity (cpm) bound to cell membranes in the absence and presence of 1 µM NDP-α-MSH. Radioactivity (cpm) obtained in the presence of test compounds is normalized with respect to 100% specific binding to determine the percent inhibition of [$I^{125}$]-NDP-α-MSH binding. Each assay is conducted in duplicate or triplicate and the actual mean values are described, with results less than 0% reported as 0%. Ki values for test compounds are determined using Graph-Pad Prism® curve-fitting software.

Competitive Binding Assay Using Eu-NDP-α-MSH. Alternatively, a competitive inhibition binding assay is performed employing Eu-NDP-α-MSH (PerkinElmer Life Sciences catalog No. AD0225) with determination by time-resolved fluorometry (TRF) of the lanthanide chelate. In comparison studies with [$I^{125}$]-NDP-α-MSH, the same values, within experimental error ranges, were obtained for percent inhibition and Ki. Typically competition experiments to determine Ki values were conducted by incubating membrane homogenates prepared from HEK-293 cells that express recombinant hMC4r with 9 different concentrations of test compounds of interest and 2 nM of Eu-NDP-α-MSH in a solution containing 25 mM HEPES buffer with 100 mM NaCl, 2 mM $CaCl_2$, 2 mM $MgCl_2$ and 0.3 mM 1,10-phenanthroline. After incubation for 90 minutes at 37° C., the reaction was stopped by filtration over Acro Well 96-well filter plates (Pall Life Sciences). The filter plates were washed 4 times with 200 µL of ice-cold phosphate-buffered saline. DELFIA Enhancement solution (PerkinElmer Life Sciences) was added to each well. The plates were incubated on a shaker for 15 minutes and read at 340 nm excitation and 615 nm emission wavelengths. Each assay was conducted in duplicate and mean values were utilized. Ki values were determined by curve-fitting with Graph-Pad Prism® software using a one-site fixed-slope competition binding model.

Assay for Agonist Activity. Accumulation of intracellular cAMP was examined as a measure of the ability of the peptides of the present invention to elicit a functional response in HEK-293 cells that express MC4-R. Confluent HEK-293 cells that express recombinant hMC4-R were detached from culture plates by incubation in enzyme-free cell dissociation buffer. Dispersed cells were suspended in Hanks' Balanced Salt Solution containing 10 mM HEPES (pH 7.5), 1 mM $MgCl_2$, 1 mM glutamine, 0.5% albumin and 0.3 mM 3-isobutyl-1-methyl-xanthine (IBMX), a phosphodiesterase inhibitor. The cells were plated in 96-well plates at a density of $0.5 \times 10^5$ cells per well and pre-incubated for 10 minutes. Cells were exposed for 15 minutes at 37° C. to peptides of the present invention dissolved in DMSO (final DMSO concentration of 1%) at a concentration range of 0.05-5000 nM in a total assay volume of 200 µL. NDP-α-MSH was used as the reference agonist. cAMP levels were determined by an HTRF® cAMP cell-based assay system from Cisbio Bioassays utilizing cryptate-labeled anti-cAMP and d2-labeled cAMP, with plates read on a Perkin-Elmer Victor plate reader at 665 and 620 nM. Data analysis was performed by nonlinear regression analysis with Graph-Pad Prism® software. The maximum efficacies of the test peptides of the present invention were compared to that achieved by the reference melanocortin agonist NDP-αMSH.

Low Receptor Density Systems. In functional studies preferably a human MC4r expression system approximating maximal human physiologic receptor densities is employed. In one aspect, a tetracycline-regulated mammalian expression system that uses regulatory elements from the E. coli Tn10-encoded tetracycline (Tet) resistance operon was employed (T-REx™ System, Invitrogen). By use of the T-REx™ System, expression of the gene of interest, the human MC4-R gene, was repressed in the absence of tetracycline or doxycycline and induced in the presence of tetracycline or doxycycline, with receptor density being dependent on the concentration of tetracycline or doxycycline. See generally Yao F. et al: Tetracycline repressor, tetR, rather than the tetR-mammalian cell transcription factor fusion derivatives, regulates inducible gene expression in mammalian cells. *Hum. Gene Ther.* 9:1939-1950 (1998), incorporated here by reference. Regulation was based on the binding of tetracycline or doxycycline, a derivative of tetracycline, to the Tet repressor and derepression of the promoter controlling expression of the human MC4-R gene. In general tetracycline or related regulators, such as tetracycline-derivatives, may be used to induce the gene expression. An inducible expression plasmid for expression of human MC4-R gene under the control of the strong human cytomegalovirus immediate-early (CMV) promoter and two tetracycline operator 2 ($TetO_2$) sites was employed, together with a regulatory plasmid, pcDNA6/TR, which encodes the Tet repressor (TetR) under the control of the human SV40 promoter. Thus, expression of the human MC4-R gene from the inducible expression vector was controlled by the strong CMV promoter into which 2 copies of the tet operator 2 ($TetO_2$) sequence had been inserted in tandem. The $TetO_2$ sequences consisted of 2 copies of 19-nucleotide sequence separated by a 2 base pair spacer. Each 19 nucleotide $TetO_2$ sequence served as the binding site for 2 molecules of the Tet repressor. The expression vector pcDNA4/TO/MC4R was introduced into TREx-293 (Invitrogen, $R_{710}$-07), a cell line stably expressing the tetracycline repressor pcDNA6/TR using lipofectamin 2000 reagent (Invitrogen, 11668-019). Alternatively, both the expression vector and repressor are introduced into host cells by standard transformation or transfection methods.

The receptor density at different doxycycline concentrations was quantified in terms of binding per mg of protein derived from cell membranes using $[I^{125}]$-NDP-α-MSH in receptor binding saturation studies to determine a $B_{max}$ value. The table below quantifies the receptor density:

| Doxycycline (ng/mL) | $B_{max}$ ± SD (fmol/mg) | $K_{D(app)}$ ± SD (pM) | n |
|---|---|---|---|
| 0.1 | 62 ± 13 | 114 ± 57 | 8 |
| 1 | 207 ± 128 | 118 ± 37 | 11 |
| 10 | 10113 ± 2538 | 139 ± 41 | 11 |

By comparison, transformed or transfected cells not under control of a tetracycline- or doxycycline-regulated expression system, such as HEK-293 cells that express recombinant hMC4r used for $[I^{125}]$-NDP-α-MSH competitive inhibition assays, typically resulted in a $B_{max}$ value of approximately 400 fmol/mg using $[I^{125}]$-NDP-α-MSH. A receptor density $B_{max}$ value of between approximately 80 and 20 fmol/mg using $[I^{125}]$-NDP-α-MSH, preferably between approximately 80 and 40 fmol/mg using $[I^{125}]$-NDP-α-MSH, is a low density receptor system that approximates maximal human physiologic receptor densities.

6. Combination Therapy

Combination Therapy for Diabetes and/or Weight Regulation. One or more compounds of this invention may be combined with at least one other pharmacologically active agent that is useful in the treatment of diabetes, such as other anti-diabetic drugs. One or more compounds of the invention may also be combined with at least one other pharmacologically active agent that is useful in the treatment of obesity and/or overweight, such as other anti-obesity drugs that affect energy expenditure, glycolysis, gluconeogenesis, glucogenolysis, lipolysis, lipogenesis, fat absorption, fat storage, fat excretion, hunger and/or satiety and/or craving mechanisms, appetite/motivation, food intake, or gastrointestinal motility.

One or more compounds of this invention may in addition or alternatively further be combined with at least one other pharmacologically active agent that is useful in the treatment of diseases, disorders and/or conditions associated with obesity and/or overweight, such as insulin resistance; impaired glucose tolerance; type 2 diabetes; metabolic syndrome; dyslipidemia (including hyperlipidemia); hypertension; heart disorders (e.g. coronary heart disease, myocardial infarction); cardiovascular disorders; non-alcoholic fatty liver disease (including non-alcoholic steatohepatitis); joint disorders (including secondary osteoarthritis); gastroesophageal reflux; sleep apnea; atherosclerosis; stroke; macro and micro vascular diseases; steatosis (e.g. in the liver); gall stones; and gallbladder disorders.

According to an additional aspect of the invention there is provided a combination treatment comprising the administration of a pharmacologically effective amount of a compound of this invention, or a pharmaceutically acceptable salt thereof, optionally together with a pharmaceutically acceptable diluent or carrier, with the simultaneous, sequential or separate administration one or more of the following agents selected from:

insulin and insulin analogues;

insulin secretagogues, including sulphonylureas (e.g. glipizide) and prandial glucose regulators (sometimes called "short-acting secretagogues"), such as meglitinides (e.g. repaglinide and nateglinide);

agents that improve incretin action, for example dipeptidyl peptidase IV (DPP-4) inhibitors (e.g. vildagliptin, saxagliptin, and sitagliptin), and glucagon-like peptide-1 (GLP-1) agonists (e.g. exenatide);

insulin sensitising agents including peroxisome proliferator activated receptor gamma (PPARγ) agonists, such as thiazolidinediones (e.g. pioglitazone and 20 rosiglitazone), and agents with any combination of PPAR alpha, gamma and delta activity;

agents that modulate hepatic glucose balance, for example biguanides (e.g. metformin), fructose 1,6-bisphosphatase inhibitors, glycogen phopsphorylase inhibitors, glycogen synthase kinase inhibitors, and glucokinase activators;

agents designed to reduce/slow the absorption of glucose from the intestine, such as alpha-glucosidase inhibitors (e.g. miglitol and acarbose);

agents which antagonise the actions of or reduce secretion of glucagon, such as amylin analogues (e.g. pramlintide);

agents that prevent the reabsorption of glucose by the kidney, such as sodium dependent glucose transporter 2 (SGLT-2) inhibitors (e.g. dapagliflozin);

agents designed to treat the complications of prolonged hyperglycaemia, such as aldose reductase inhibitors (e.g. epalrestat and ranirestat); and agents used to treat complications related to micro-angiopathies;

anti-dyslipidemia agents, such as HMG-CoA reductase inhibitors (statins, e.g. rosuvastatin) and other cholesterol-lowering agents; PPARα agonists (fibrates, e.g. gemfibrozil and fenofibrate); bile acid sequestrants (e.g.cholestyramine); cholesterol absorption inhibitors (e.g. plant sterols (i.e. phytosterols), synthetic inhibitors); cholesteryl ester transfer protein (CETP) inhibitors; inhibitors of the ileal bile acid transport system (IBAT inhibitors); bile acid binding resins; nicotinic acid (niacin) and analogues thereof; anti-oxidants, such as probucol; and omega-3 fatty acids;

antihypertensive agents, including adrenergic receptor antagonists, such as beta blockers (e.g. atenolol), alpha blockers (e.g. doxazosin), and mixed alpha/beta blockers (e.g. labetalol); adrenergic receptor agonists, including alpha-2 agonists (e.g. clonidine); angiotensin converting enzyme (ACE) inhibitors (e.g. lisinopril), calcium channel blockers, such as dihydropyridines (e.g. nifedipine), phenylalkylamines (e.g. verapamil), and benzothiazepines (e.g. diltiazem); angiotensin II receptor antagonists (e.g. candesartan); aldosterone receptor antagonists (e.g. eplerenone); centrally acting adrenergic drugs, such as central alpha agonists (e.g. clonidine); and diuretic agents (e.g. furosemide);

haemostasis modulators, including antithrombotics, such as activators of fibrinolysis; thrombin antagonists; factor VIIa inhibitors; anticoagulants, such as vitamin K antagonists (e.g. warfarin), heparin and low molecular weight analogues thereof, factor Xa inhibitors, and direct thrombin inhibitors (e.g. argatroban);

antiplatelet agents, such as cyclooxygenase inhibitors (e.g. aspirin), adenosine diphosphate (ADP) receptor inhibitors (e.g. clopidogrel), phosphodiesterase inhibitors (e.g. cilostazol), glycoprotein IIB/IIA inhibitors (e.g. tirofiban), and adenosine reuptake inhibitors (e.g. dipyridamole);

anti-obesity agents, such as appetite suppressant (e.g. ephedrine), including noradrenergic agents (e.g. phentermine) and serotonergic agents (e.g. sibutramine), pancreatic lipase inhibitors (e.g. orlistat), microsomal transfer protein (MTP) modulators, diacyl glycerolacyltransferase (DGAT) inhibitors, and cannabinoid (CB1) receptor antagonists (e.g. rimonabant);

feeding behavior modifying agents, such as orexin receptor modulators and melanin-concentrating hormone (MCH) modulators;

glucagon like peptide-1 (GLP-1) receptor modulators;

neuropetideY (NPY)/NPY receptor modulators;

pyruvate dehydrogenase kinase (PDK) modulators;

serotonin receptor modulators;

leptin/leptin receptor modulators;

ghrelin/ghrelin receptor modulators;

monoamine transmission-modulating agents, such as selective serotonin reuptake inhibitors (SSRI), noradrenaline reuptake inhibitors (NARI), noradrenalineserotonin reuptake inhibitors (SNRI), triple monoamine reuptake blockers (e.g. tesofensine), and monoamine oxidase inhibitors (MAOI);

or a pharmaceutically acceptable salt, solvate, solvate of such a salt or a prodrug thereof, optionally together with a pharmaceutically acceptable carrier to a mammal, such as man, in need of such therapeutic treatment.

In one aspect of this invention there is provided a combination treatment comprising the administration of a pharmacologically pharmaceutically effective amount of a compound of this invention, or a pharmaceutically acceptable salt thereof, optionally together with a pharmaceutically acceptable carrier, with the simultaneous, sequential or separate administration of very low calorie diets (VLCD) or low-calorie diets (LCD).

In an additional aspect of the invention, there is provided a method of treating obesity and/or overweight and therewith associated complications in a mammal, such as man, in need of such treatment which comprises administering to said animal a pharmacologically effective amount of a compound of this invention, or a pharmaceutically acceptable salt thereof, optionally together with a pharmaceutically acceptable carrier, in simultaneous, sequential or separate administration with a pharmacologically effective amount of a compound from one of the other classes of compounds described in this combination section, or a pharmaceutically acceptable salt, solvate, solvate of such a salt or a prodrug thereof, optionally together with a pharmaceutically acceptable carrier.

In an additional aspect of the invention, there is provided a method of treating diabetes, in particular type 2 diabetes, in a mammal, such as man, in need of such treatment which comprises administering to said animal a pharmacologically effective amount of a compound of this invention, or a pharmaceutically acceptable salt thereof, optionally together with a pharmaceutically acceptable carrier, in simultaneous, sequential or separate administration with a pharmacologically effective amount of a compound from one of the other classes of compounds described in this combination section, or a pharmaceutically acceptable salt, solvate, solvate of such a salt or a prodrug thereof, optionally together with a pharmaceutically acceptable carrier.

According to a further aspect of the invention there is provided a pharmaceutical composition which comprises a compound of this invention, or a pharmaceutically acceptable salt thereof, and a compound from one of the other classes of compounds described in this combination section or a pharmaceutically acceptable salt, solvate, solvate of such a salt or a prodrug thereof, in association with a pharmaceutically acceptable carrier.

According to a further aspect of this invention there is provided a kit comprising a compound of this invention, or a pharmaceutically acceptable salt thereof, and a compound from one of the other classes of compounds described in this combination section or a pharmaceutically acceptable salt, solvate, solvate of such a salt or a prodrug thereof.

Combination Therapy with GLP-1 Receptor Agonists. Glucagon analogs and compounds related to glucagon, including pre-proglucagon, glucagon, glucagon-like peptide-1 (GLP-1), glucagon-like peptide-2 (GLP-2) and oxyntomodulin (OXM), are known in the art. Pre-proglucagon is a 179 amino acid precursor polypeptide. Proglucagon is a 158 amino acid precursor polypeptide that is differentially processed in vivo to form glucagon, GLP-1, GLP-2, and OXM. GLP-1, GLP-2 and OXM molecules are involved in a wide variety of physiological functions, including glucose homeostasis, insulin secretion, gastric emptying and intestinal growth, as well as regulation of food intake.

Glucagon is a 29-amino acid peptide that corresponds to amino acids 53 to 81 of proglucagon. OXM is a 37 amino acid peptide which includes the complete 29 amino acid sequence of glucagon with an octapeptide carboxyterminal extension (amino acids 82 to 89 of pre-proglucagon). Human GLP-1 is a 30- or 31-amino acid peptide, generally C-terminally amidated, of the structure H-His-Ala-Glu-Gly-Thr-Phe-Thr-Ser-Asp-Val-Ser-Ser-Tyr-Leu-Glu-Gly-Gln-Ala-Ala-Lys-Glu-Phe-Ile-Ala-Trp- Leu-Val-Lys-Gly-Arg-$NH_2$ (30 amino acid, with the 31 amino acid variant having a C-terminal Gly-OH). GLP-1 is believed to increase insulin secretion from the pancreas in a glucose-dependent manner; decrease glucagon secretion from the pancreas by engagement of a specific G protein-coupled receptor; increase insulin-sensitivity in both alpha cells and beta cells; increase beta cells mass and insulin gene expression, post-translational processing and incretion; inhibit acid secretion and gastric emptying in the stomach; decrease food intake by increasing satiety in the brain; and promote insulin sensitivity.

There are a number of GLP-1 receptor agonists which have been approved for pharmaceutical use in one or more, including exenatide, sold under the trade names Byetta® and Bydureon®; liraglutide, sold under the trade names Victoza® and Saxenda®; lixisenatide, sold under the trade name Lyxumia®; albiglutide, sold under the trade name Tanzeum®; and dulaglutide, sold under the trade name Trulicity®. Exenatide is an incretin mimetic which is a synthetic version of exendin-4, a hormone found in the saliva of the Gila monster. Liraglutide, also an incretin mimetic, is a derivative of GLP-1. Lixisenatide, also an incretin mimetic, is derived from the first 39 amino acids in the sequence of exendin-4, omitting proline at position 38 and adding six lysine residues. Albiglutide is a dipeptidyl peptidase-4-resistant GLP-1 dimer fused to human albumin. Dulaglutide is a fusion protein consisting of two identical, disulfide-linked chains, with each chain including a modified N-terminal GLP-1 analog sequence covalently linked to the Fc portion of a modified human immunoglobulin heavy chain by a peptide linker. The foregoing approved GLP-1 receptor agonists are all peptides or small proteins, and are administered typically by subcutaneous injection. Some require daily injections; others can be injected at weekly or longer intervals.

Preferred GLP-1 receptor agonists with utility in the current invention include exenatide, liraglutide, lixisenatide, albiglutide, and dulaglutide, all of which are approved pharmaceutical drugs in the United States or elsewhere in the world. Other naturally expressed peptides which bind to the GLP-1 receptor may be employed in the invention, and are to be considered for purposes of this invention as GLP-1 receptor agonists, including pre-proglucagon, glucagon, GLP-1, GLP-2 and OXM. Other peptides and derivatives and modifications of peptides which may be employed in the current invention include, but are not limited to, those peptides and other compounds disclosed in WO2006/134340, WO2007/100535, WO2008/10101, WO2008/152403, WO2009/155257, WO2009/155258, WO2010/070252, WO2010/070253, WO2010/070255, WO2010/070251, WO2011/006497, WO2011/160630, WO2011/160633, WO2013/092703, WO2014/041195, WO2015/055802, WO2015149627, WO2015/155139, WO2015/155140, WO2015/155141, WO2015/155151, WO2015/193378, WO2015/193381, WO2016/0154014, and WO2016/046753.

Thus in one aspect, the invention provides a method of treating a patient with obesity, diabetes or metabolic syndrome, comprising administering to the patient (a) a pharmaceutical composition comprising a compound of formula I in a quantity sufficient to induce at least minimal weight loss when administered as a monotherapy not in conjunction with a GLP-1 receptor agonist and (b) a GLP-1 receptor agonist in a quantity sufficient to induce glycemic control but not weight loss when administered as a monotherapy not in conjunction with the compound of formula I. Preferably the method elicits a synergistic effect on treatment of obesity. The quantity and schedule of administration of the compound of formula I and the GLP-1 receptor agonist may together be sufficient to produce synergistic effect in the treatment of obesity. Alternatively, or additionally, the method elicits a synergistic effect on treatment of glycemic control. The quantity and schedule of administration of the compound of formula I and the GLP-1 receptor agonist may together be sufficient to produce synergistic effect in the treatment of glycemic control. In the method, the compound of formula I may be the compound of formula II, optionally administered by oral means, and the GLP-1 receptor agonist may be administered by subcutaneous injection. The GLP-1 receptor agonist may be liraglutide or exenatide administered daily or twice daily, or may be lixisenatide, albiglutide, dulaglutide or an extended release formulation of exenatide or liraglutide administered at weekly or greater intervals. In the method, either or both the compound of formula I and the GLP-1 may be sustained-release, including a sustained-released GLP-1 receptor agonist with a duration of action of at least about twenty-four hours, at least about one week or at least about two weeks.

In another aspect, the invention provides a method of decreasing side effects associated with therapeutic agents for treatment of obesity, diabetes or metabolic syndrome in a patient, comprising:
administration of a quantity of a pharmaceutical composition comprising a compound of formula I, wherein the quantity of the compound of formula I administered, if administered as a monotherapy not in conjunction with GLP-1 receptor agonist, is not sufficient to initiate the desired pharmacological response in treating at least one condition from the group comprising obesity, diabetes and metabolic syndrome in the patient when administered as a monotherapy; and
administration of a quantity of GLP-1 receptor agonist, wherein the quantity of GLP-1 receptor agonist administered, if administered as a monotherapy not in conjunction with the compound of formula I, is not sufficient to initiate the desired pharmacological response in treating at least one condition from the group comprising obesity, diabetes and metabolic syndrome in the patient when administered as a monotherapy;
wherein the quantity of the compound of formula I and the quantity of GLP-1 receptor agonist are together effective to initiate the desired pharmacological response treating at least one condition from the group comprising obesity, diabetes and metabolic syndrome in the patient,
thereby reducing side effects in the treatment of at least one of obesity, diabetes or metabolic syndrome in the patient.

In the practice of this method, the quantity of MC4r agonist administered is in one aspect not sufficient to initiate the desired pharmacological response of inducing weight loss. In another aspect, the quantity of MC4r agonist administered is sufficient to induce minimal weight loss.

The desired pharmacological response may be inducing weight loss or inducing glycemic control.

In another aspect, the invention provides a method of treating obesity or inducing weight loss in an obese patient, comprising the steps of:
establishing a dose of a GLP-1 receptor agonist which induces glycemic control in the patient but which induces no more than minimal weight loss in the patient;
administration of the dose of the GLP-1 receptor agonist; and
administration of a a pharmaceutical composition comprising a compound of formula I;

wherein the dose of the GLP-1 receptor agonist and the quantity of compound of formula I are effective to treat obesity or to induce weight loss.

In this method, the dose of GLP-1 receptor agonist preferably does not induce minimal weight loss in the patient. The GLP-1 receptor agonist may be administered by subcutaneous injection, such as liraglutide or exenatide administered daily or twice daily or lixisenatide, albiglutide, dulaglutide or an extended release formulation of exenatide or liraglutide administered at weekly or greater intervals. In the method, administration of the dose of the GLP-1 receptor agonist and administration of a MC4r agonist may elicit a synergistic effect on treatment of obesity, or may elicit a synergistic effect on inducing glycemic control, or both.

Combination Therapy with Phosphodiesterase Inhibitors. For certain applications and indications, it is desirable to increase production of and maintain levels of cyclic adenoise 3',5' monophosphate (cAMP), a nucleotide messenger associated with inflammatory cell activity. Certain compounds of this invention increase intracellular levels of cAMP, and can be coadministered with compounds or substances that inhibit the degradation of cAMP. cAMP is hydrolyzed to an inactive form by phosphodiesterase (PDE); compounds or substances that inhibit PDE may thereby result in maintenance of and/or an increase in available cAMP. A class of compounds known as PDE inhibitors has been extensively studied for use in treatment of inflammatory diseases, such as asthma, COPD and acute respiratory distress syndrome. Preferred are inhibitors of PDE type 1, 2, 3, 4, 7, 8, 10 or 11; in one aspect this includes cAMP-PDE inhibitors that are selective PDE type 4 inhibitors or inhibitors having selectivity for one particular type of PDE 4 isoenzyme, such as, by way of example, rolipram, cilomilast, ibudilast, and piclamilast. In general, the methods and compositions of this invention may comprise use of one or more cAMP-PDE inhibitors.

7. Representative Compounds of the Invention

The invention is further illustrated by the following non-limiting examples of representative compounds.

1. N-[(1R)-2-[4-[(1-acetyl-4-piperidyl)-isobutyl-amino]piperazin-1-yl]-1-[(4-chlorophenyl)methyl]-2-oxo-ethyl]-2-amino-2-methyl-propanamide The compound was synthesized using the methods of the foregoing synthetic schemes. The compound had the structural formula:

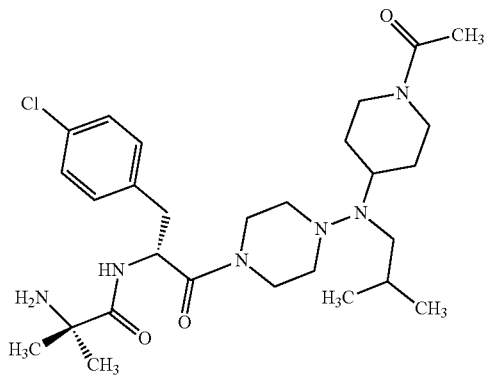

and a molecular formula of $C_{28}H_{45}ClN_6O_3$. The compound was prepared as the TFA salt, and had a molecular weight of 549.15 without salt, and 777.19 with TFA salt.

In binding studies, the compound had a Ki of 5 nM at MC4r and 200 nM at MC1r. In functional studies in a human MC4r expression system approximating maximal physiologic receptor densities, the compound had a relative efficacy, compared to NDP-α-MSH, of 33%, with an $EC_{50}$ value of 23 nM.

2. N-[(1R)-2-[4-[(1-acetyl-4-piperidyl)-isobutyl-amino]piperazin-1-yl]-1-[(4-chlorophenyl)methyl]-2-oxo-ethyl]-1-amino-cyclopropanecarboxamide The compound was synthesized using the methods of the foregoing synthetic schemes. The compound had the structural formula:

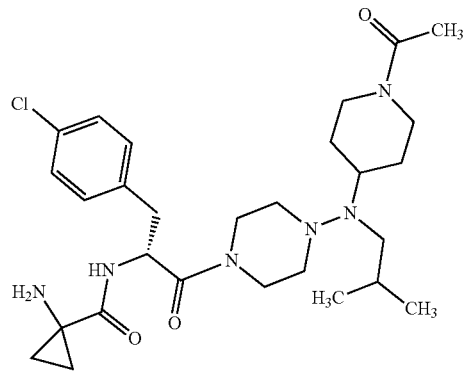 [SMILES: CC(=O)N1CCC(N(CC(C)C)N2CCN(C(=O)[C@@H](Cc3ccc(Cl)cc3)NC(=O)C3(N)CC3)CC2)CC1]

and a molecular formula of $C_{28}H_{43}ClN_6O_3$. The compound was prepared as the TFA salt, and had a molecular weight of 547.13 without salt, and 775.17 with TFA salt.

In binding studies, the compound had a Ki of 5 nM at MC4r and 40 nM at MC1r. In functional studies in a human MC4r expression system approximating maximal physiologic receptor densities, the compound had a relative efficacy, compared to NDP-α-MSH, of 3%.

3. N-[(1R)-2-[4-[(1-acetyl-4-piperidyl)-isobutyl-amino]piperazin-1-yl]-1-[(4-chlorophenyl)methyl]-2-oxo-ethyl]-1-amino-cyclobutanecarboxamide The compound was synthesized using the methods of the foregoing synthetic schemes. The compound had the structural formula:

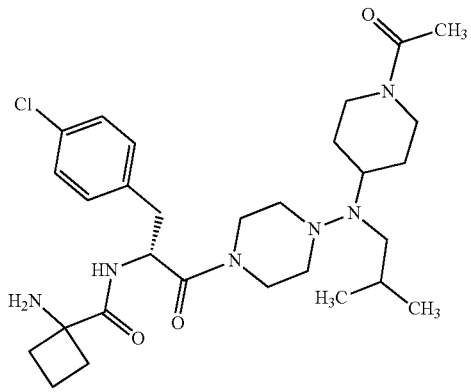 [SMILES: CC(=O)N1CCC(N(CC(C)C)N2CCN(C(=O)[C@@H](Cc3ccc(Cl)cc3)NC(=O)C3(N)CCC3)CC2)CC1]

and a molecular formula of $C_{29}H_{45}ClN_6O_3$. The compound was prepared as the TFA salt, and had a molecular weight of 561.16 without salt, and 789.20 with TFA salt.

In binding studies, the compound had a Ki of 3 nM at MC4r. In functional studies in a human MC4r expression system approximating maximal physiologic receptor densities, the compound had a relative efficacy, compared to NDP-α-MSH, of 10%.

4. N-[(1R)-2-[4-[(1-acetyl-4-piperidyl)-isobutyl-amino]piperazin-1-yl]-1-[(4-chlorophenyl)methyl]-2-oxo-ethyl]-1-amino-cyclopentanecarboxamide The compound was synthesized using the methods of the foregoing synthetic schemes. The compound had the structural formula:

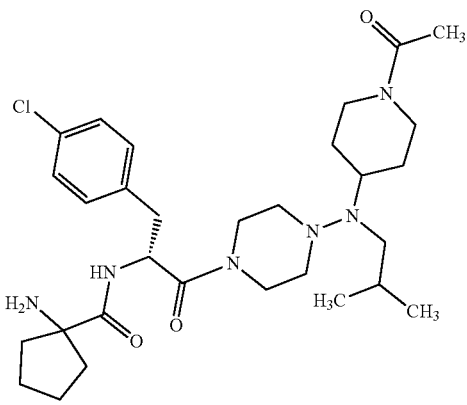 [SMILES: CC(=O)N1CCC(N(CC(C)C)N2CCN(C(=O)[C@@H](Cc3ccc(Cl)cc3)NC(=O)C3(N)CCCC3)CC2)CC1]

and a molecular formula of $C_{30}H_{47}ClN_6O_3$. The compound was prepared as the TFA salt, and had a molecular weight of 575.19 without salt, and 803.23 with TFA salt.

In binding studies, the compound had a Ki of 4 nM at MC4r. In functional studies in a human MC4r expression system approximating maximal physiologic receptor densities, the compound had a relative efficacy, compared to NDP-α-MSH, of 10%.

5. N-[(1R)-2-[4-[(1-acetyl-4-piperidyl)-isobutyl-amino]piperazin-1-yl]-1-[(4-chlorophenyl)methyl]-2-oxo-ethyl]-1-amino-cyclohexanecarboxamide The compound was synthesized using the methods of the foregoing synthetic schemes. The compound had the structural formula:

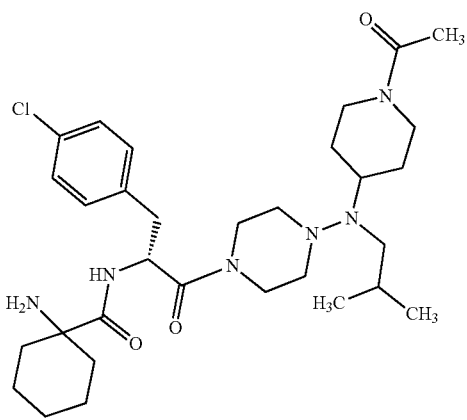 [SMILES: CC(=O)N1CCC(N(CC(C)C)N2CCN(C(=O)[C@@H](Cc3ccc(Cl)cc3)NC(=O)C3(N)CCCCC3)CC2)CC1]

and a molecular formula of $C_{31}H_{49}ClN_6O_3$. The compound was prepared as the TFA salt, and had a molecular weight of 589.21 without salt, and 817.25 with TFA salt.

In binding studies, the compound had a Ki of 4 nM at MC4r. In functional studies in a human MC4r expression system approximating maximal physiologic receptor densities, the compound had a relative efficacy, compared to NDP-α-MSH, of 15%, with an $EC_{50}$ value of 9 nM.

6. N-[(1R)-2-[4-[(1-acetyl-4-piperidyl)-isobutyl-amino]piperazin-1-yl]-1-[(4-chlorophenyl)methyl]-2-oxo-ethyl]-2-amino-2-ethyl-butanamide The compound was synthesized using the methods of the foregoing synthetic schemes. The compound had the structural formula:

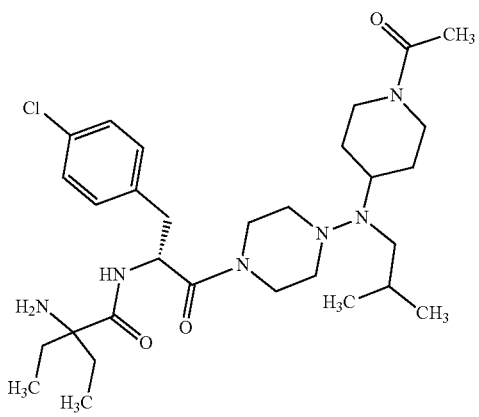 [SMILES: CCC(N)(CC)C(=O)N[C@H](Cc1ccc(Cl)cc1)C(=O)N1CCN(N(CC(C)C)C2CCN(C(C)=O)CC2)CC1]

and a molecular formula of $C_{30}H_{49}ClN_6O_3$. The compound was prepared as the TFA salt, and had a molecular weight of 577.20 without salt, and 805.24 with TFA salt.

In binding studies, the compound had a Ki of 13 nM at MC4r. In functional studies in a human MC4r expression system approximating maximal physiologic receptor densities, the compound had a relative efficacy, compared to NDP-α-MSH, of 34%, with an $EC_{50}$ value of 25 nM.

7. N-[(1R)-2-[4-[(1-acetyl-4-piperidyl)-isobutyl-amino]piperazin-1-yl]-1-[(4-chlorophenyl)methyl]-2-oxo-ethyl]-1-amino-cycloheptanecarboxamide The compound was synthesized using the methods of the foregoing synthetic schemes. The compound had the structural formula:

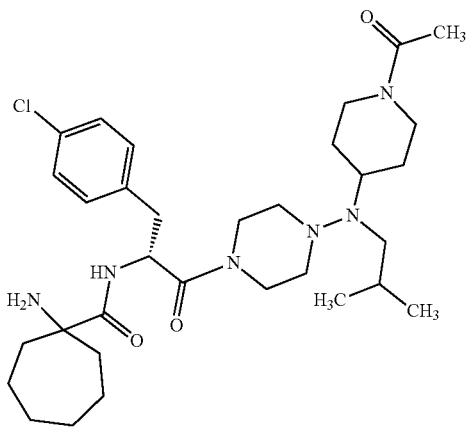 [SMILES: CC(=O)N1CCC(N(CC(C)C)N2CCN(C(=O)[C@@H](Cc3ccc(Cl)cc3)NC(=O)C3(N)CCCCCC3)CC2)CC1]

and a molecular formula of $C_{32}H_{51}ClN_6O_3$. The compound was prepared as the TFA salt, and had a molecular weight of 603.24 without salt, and 831.28 with TFA salt.

In binding studies, the compound had a Ki of 3 nM at MC4r. In functional studies in a human MC4r expression system approximating maximal physiologic receptor densities, the compound had a relative efficacy, compared to NDP-α-MSH, of 8%.

8. 4-[[4-[(2R)-2-[(2-amino-2-methyl-propanoyl)amino]-3-(4-chlorophenyl)propanoyl]piperazin-1-yl]isobutyl-amino]-N-ethyl-piperidine-1-carboxamide The compound was synthesized using the methods of the foregoing synthetic schemes. The compound had the structural formula:

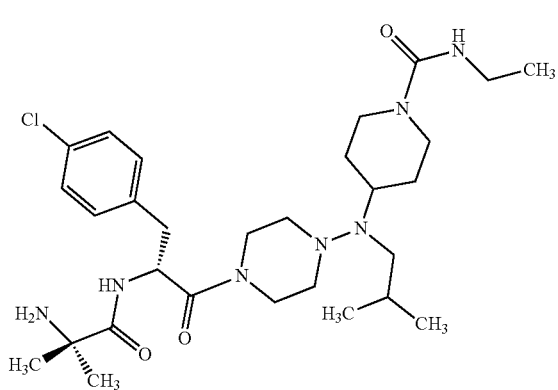

and a molecular formula of $C_{29}H_{48}ClN_7O_3$. The compound was prepared as the TFA salt, and had a molecular weight of 578.19 without salt, and 806.23 with TFA salt.

In binding studies, the compound had a Ki of 6 nM at MC4r and 150 nM at MC1r. In functional studies in a human MC4r expression system approximating maximal physiologic receptor densities, the compound had a relative efficacy, compared to NDP-α-MSH, of 28%, with an $EC_{50}$ value of 52 nM.

9. N-[(1R)-2-[4-[(1-acetyl-4-piperidyl)-isobutyl-amino]piperazin-1-yl]-1-[(4-chlorophenyl)methyl]-2-oxo-ethyl]-2-methyl-2-(methylamino)propanamide The compound was synthesized using the methods of the foregoing synthetic schemes. The compound had the structural formula:

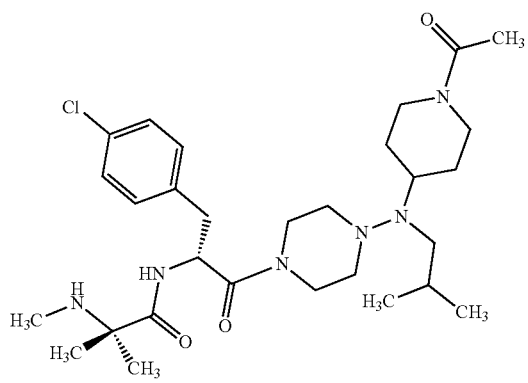

and a molecular formula of $C_{29}H_{47}ClN_6O_3$. The compound was prepared as the TFA salt, and had a molecular weight of 563.17 without salt, and 677.19 with TFA salt.

In binding studies, the compound had a Ki of 5 nM at MC4r. In functional studies in a human MC4r expression system approximating maximal physiologic receptor densities, the compound had a relative efficacy, compared to NDP-α-MSH, of 19%, with an $EC_{50}$ value of 5 nM.

10. 2-amino-N-[(1R)-1-[(4-chlorophenyl)methyl]-2-[4-[[1-(2-hydroxyacetyl)-4-piperidyl]-isobutyl-amino]piperazin-1-yl]-2-oxo-ethyl]-2-methyl-propanamide The compound was synthesized using the methods of the foregoing synthetic schemes. The compound had the structural formula:

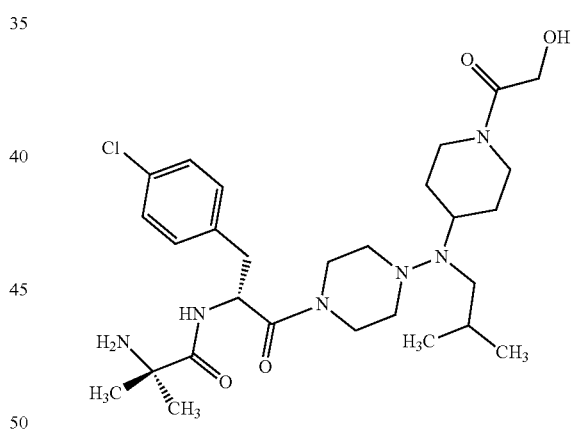

and a molecular formula of $C_{28}H_{45}ClN_6O_4$. The compound was prepared as the TFA salt, and had a molecular weight of 565.15 without salt, and 793.19 with TFA salt.

In binding studies, the compound had a Ki of 5 nM at MC4r. In functional studies in a human MC4r expression system approximating maximal physiologic receptor densities, the compound had a relative efficacy, compared to NDP-α-MSH, of 22%, with an $EC_{50}$ value of 9 nM.

11. N-[(1R)-2-[4-[(1-acetyl-4-piperidyl)-isobutyl-amino]piperazin-1-yl]-1-[(4-chlorophenyl)methyl]-2-oxo-ethyl]-2-methyl-pyrrolidine-2-carboxamide The compound was synthesized using the methods of the foregoing synthetic schemes. The compound had the structural formula:

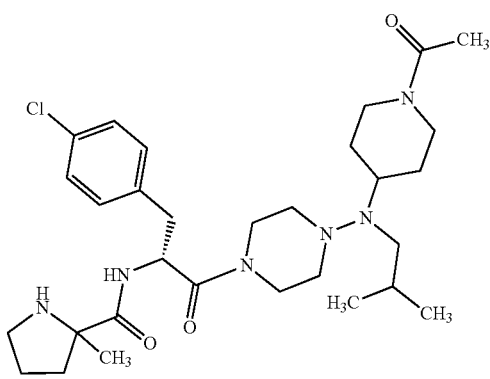 [SMILES: CC(=O)N1CCC(N(CC(C)C)N2CCN(C(=O)[C@@H](Cc3ccc(Cl)cc3)NC(=O)C3(C)CCCN3)CC2)CC1]

and a molecular formula of $C_{30}H_{47}ClN_6O_3$. The compound was prepared as the TFA salt, and had a molecular weight of 575.19 without salt, and 803.23 with TFA salt.

In binding studies, the compound had a Ki of 6 nM at MC4r. In functional studies in a human MC4r expression system approximating maximal physiologic receptor densities, the compound had a relative efficacy, compared to NDP-α-MSH, of 13%, with an $EC_{50}$ value of 6 nM.

8. Examples

The invention is further illustrated by the following non-limiting examples.

1. Receptor Binding and Function

Melanocortin receptor binding and function of Compound 7.1 was tested. Ki binding values (nM) were calculated utilizing the percent inhibit of the binding of iodine-125 labeled NDP-α-MSH against B16-F1 cells for mMC1r, and human recombinant CHO cells for hMC3r, hMC4r and hMC5r, with the inhibition constant calculated using the Cheng Prusoff equation. Functional results ($EC_{50}$ and efficacy) were calculated utilizing cAMP assays with NDP-α-MSH for mMC1r, hMC3r and hMC4r, ACTH for hMC2r, and α-MSH for hMC5r for agonist measures, with the same target cells for melanocortin receptors mMC1r, hMC3r, hMC4r and hMC5r, and human recombinant Cloudman M3 cells for hMC2r.

| Melanocortin Receptor Binding and Function of Compound 7.1 | | | |
|---|---|---|---|
| | cAMP $EC_{50}$ (nM) | cAMP Efficacy (%) | Binding, Ki (nM) |
| mMC1r | 460 | 72 | 93 |
| hMC2r | >1000 | 22 | — |
| hMC3r | >1000 | 28 | 1300 |
| hMC4r | 6 | 91 | 14 |
| hMC5r | >1000 | 20 | 1200 |

2. Body Weight and Food Intake

Compound 7.1 was assessed in a body weight and food intake in vivo study in diet induced obese (DIO) mice. $C_{57}BL/6$ male DIO mice were utilized, that were 17 weeks of age on arrival. Animals were pre-conditioned on a high-fat diet for 11 weeks by Jackson Labs. Weight variation of animals at the time of treatment initiation did not exceed ±20% of the mean weight. Animals were single housed within a limited access rodent facility, and provided ad libitum with a commercial rodent diet and free access to drinking water. Animals were randomized into five groups, a vehicle group, three dose levels of compound 7.1 (3 mg/kg, 10 mg/kg and 30 mg/kg), and Peptide A, a positive control cyclic peptide of the formula Ac-Arg-cyclo(Orn-Asn-D-Phe-Arg-Trp-Glu)-$NH_2$. Following three days of sham dosing, animals were dosed for three days, with vehicle or Compound 7.1 dosed orally once daily at within one hour of lights out in the AM, and Peptide A dosed by subcutaneous injection twice daily within one hour before lights out and six hours after lights out. Body weights were measured one hour prior to lights out, and feed weights were measured both one hour prior to lights out and six hours post lights out.

| Mean ± SEM Group Body Weight Change | | | | | | | | | | | | |
|---|---|---|---|---|---|---|---|---|---|---|---|---|
| | Body Weight Change (%) | | | | | | | | | | | |
| | Day 0 | | | Day 1 | | | Day 2 | | | Day 3 | | |
| Treatment | Mean | SEM | N | Mean | SEM | N | Mean | SEM | N | Mean | SEM | N |
| Vehicle | 0 | 0 | 9 | −0.68 | 0.32 | 9 | −1.80 | 0.42 | 9 | −1.99 | 0.44 | 9 |
| 7.1 (3 mg/kg) | 0 | 0 | 9 | −1.97 | 0.52 | 9 | −2.92 | 0.69 | 9 | −3.80* | 0.81 | 9 |
| 7.1 (10 mg/kg) | 0 | 0 | 9 | −2.48* | 0.21 | 9 | −3.77** | 0.41 | 9 | −4.35** | 0.47 | 9 |
| 7.1 (30 mg/kg) | 0 | 0 | 9 | −4.41** | 0.42 | 9 | −5.82** | 0.48 | 9 | −7.08** | 0.79 | 9 |
| Peptide A (1 mg/kg) | 0 | 0 | 9 | −5.69** | 0.39 | 9 | −8.37** | 0.38 | 9 | −8.78** | 0.54 | 9 |

| | Mean ± SEM Group Feed Intake at 24 Hours Post Lights Out | | | | | | | | |
|---|---|---|---|---|---|---|---|---|---|
| | Food Intake - 24 Hours (g) | | | | | | | | |
| | Day 0 | | | Day 1 | | | Day 2 | | |
| Treatment | Mean | SEM | N | Mean | SEM | N | Mean | SEM | N |
| Vehicle | 2.23 | 0.19 | 9 | 2.23 | 0.12 | 9 | 2.47 | 0.08 | 9 |
| 7.1 (3 mg/kg) | 1.90 | 0.13 | 9 | 2.03 | 0.17 | 9 | 2.11 | 0.15 | 9 |
| 7.1 (10 mg/kg) | 1.82 | 0.08 | 9 | 1.78 | 0.14 | 9 | 2.20 | 0.19 | 9 |
| 7.1 (30 mg/kg) | 1.62* | 0.12 | 9 | 1.60* | 0.20 | 9 | 1.91* | 0.16 | 9 |
| Peptide A (1 mg/kg) | 0.99** | 0.10 | 9 | 1.10** | 0.14 | 9 | 1.67** | 0.18 | 9 |

*p<0.05 vs. sham (vehicle control) using two-way ANOVA followed by Dunnett's post-test.
**p<0.01 vs sham (vehicle control) using two-way ANOVA followed by Dunnett's post-test.

Daily treatment with compound 7.1 at 10 mg/kg and 30 mg/kg resulted in significant body weight loss from day 1 to 3. Treatment with 3 mg/kg of compound 7.1 resulted in body weight loss on day 3. Two times daily treatment with 1 mg/kg of Peptide A decreased animal body weights throughout the study. At 24 hours post lights out, treatment with 30 mg/kg compound 7.1 or 1 mg/kg Peptide A significantly inhibited feed intake by animals through the entirety of the study, compared with sham animals.

3. Plasma Concentrations Following Oral Administration

As shown in FIG. 1, plasma concentrations of the compound 7.1 were determined in Sprague-Dawley rats following oral administration of 30 mg/kg of compound 7.1. Plasma samples were measured at 15 minutes (2 animals) and 30 minutes, 1 hour, 2 hours, 4 hours, 8 hours and 24 hours (3 animals) post oral administration. The terminal half-life was 3.94 hours following the dose of 30 mg/kg, with a Tmax of 2 hours and Cmax of 780 ng/mL.

Figure 2:
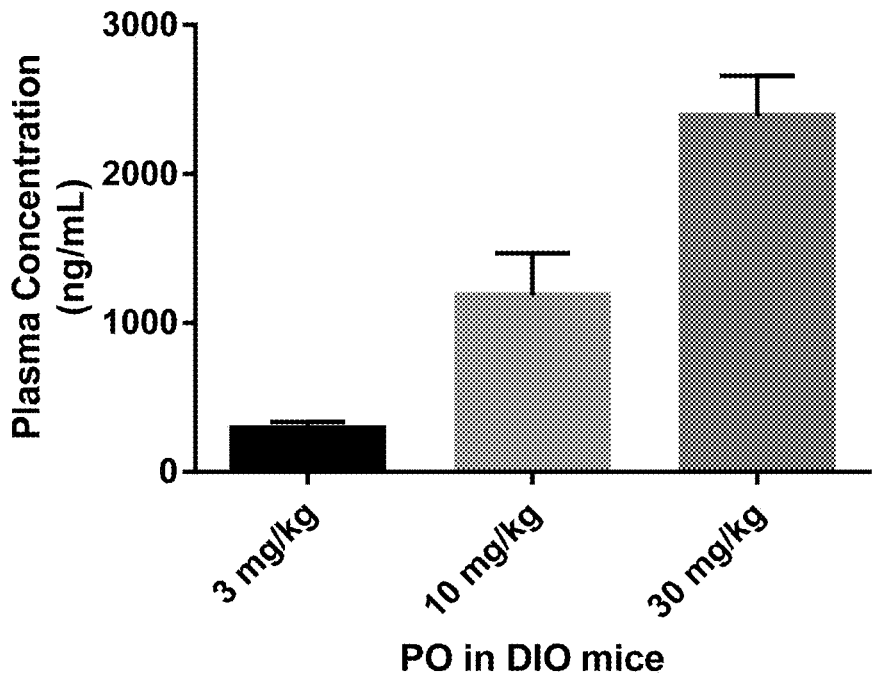
FIG. 2 is a bar graph of mean plasma concentration (ng/mL) of Compound 7.1 in DIO mice at one hour following oral administration of Compound 1 at doses of 3 mg/kg, 10 mg/kg and 30 mg/kg.

4. Plasma Concentration at One Hour Following Oral Administration of Three Dose Levels In the study of Example 8.2, at one hour after administration of 3 mg/kg, 10 mg/kg or 30 mg/kg of compound 7.1, a terminal blood draw was conducted in the DIO mice, and the plasma samples were measure for concentration of compound 7.1. Results are shown in FIG. 2.

5. Oral Administration in Leptin-Deficient Obese Mice

Figure 3:
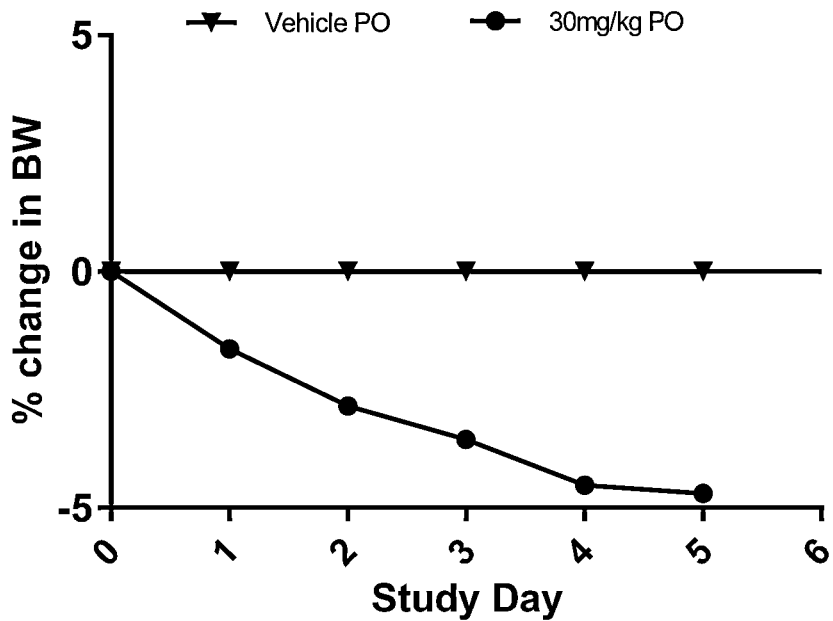
FIG. 3 is a plot of decrease in body weight percent change in leptin-deficient male mice receiving 30 mg/kg of Compound 7.1 compared to leptin-deficient male mice receiving vehicle (normalized to vehicle).

Male mice homozygous for the obese spontaneous mutation, Lep$^{ob}$, with resulting leptin protein deficiency, were individually housed with free access to feed and drinking water. All animals were sham-dosed twice daily for five days prior to initial drug administration, utilizing a vehicle dose of 3.2% mannitol and 55 nM tris(hydroxymethyl)aminomethane at pH 7.4. On day 6 a cohort of the mice received compound 7.1 dissolved into the vehicle twice daily for six consecutive days at a dose of 30 mg/kg. Body weight of animals was measured daily, with data analyzed as the percent change from baseline of each individual animal, where baseline was defined as the average weight during the first three days of sham dosing. The averaged percent change from baseline of a vehicle group was then subtracted from each value to correct for continued weight gain or other study-wide factors. The change in body weight is shown in FIG. 3 starting on study day 1, the first day of administration of compound 7.1. Leptin-deficient mice treated with compound 7.1 showed a 4.8% decrease in body weight of 4.8% compared to vehicle controls at a dose of 30 mg/kg of compound 7.1 administered twice daily.

6. Oral Administration in MC4r Knockout Mice

Figure 4:
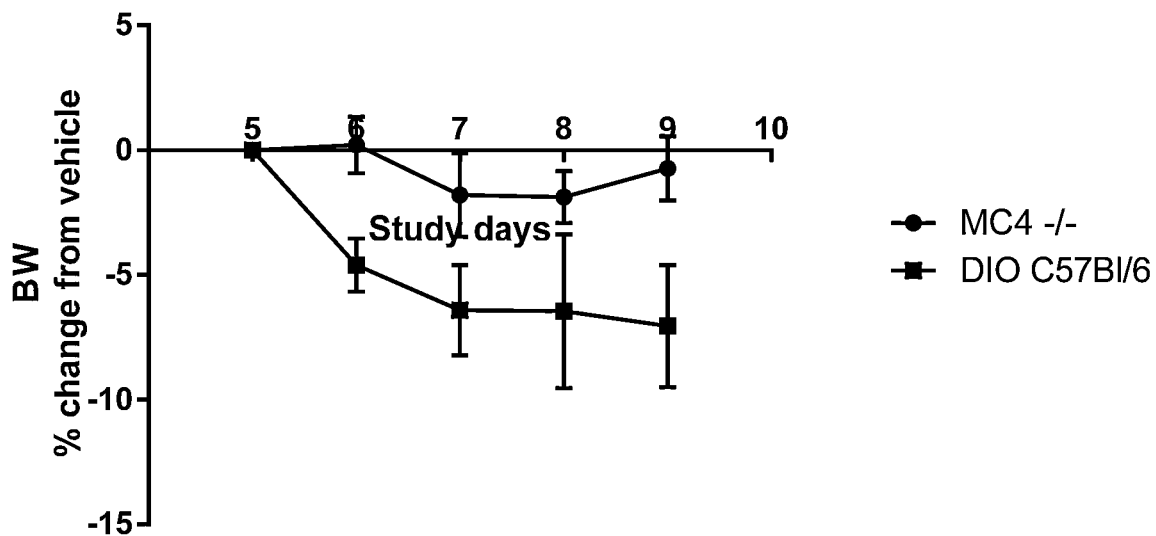
FIG. 4 is a plot of body weight (BW) percent change from vehicle in MC4−/− (MC4r knockout mice) compared to DIO $C_{57}Bl/6$ mice over time (normalized to vehicle).

Feed intake and body weight was evaluated in MCr4 knockout (MC4r −/−) mice (Jackson Laboratories) compared to $C_{57}$Bl/6 DIO mice. Two daily administration of 30/mg/kg of compound 7.1 via oral gavage resulted in significant body weight loss in DIO mice, but not in MC4r (−/−) mice, when each cohort was compared to their own vehicle group. Feed weights were taken at time 0, 2, 6 and 24 hours post lights out. There were no differences in food consumption in the MC4r (−/−) mice receiving compound 7.1 compared to MC4r (−/−) mice receiving vehicle only, but in the DIO mice food consumption was significantly decreased at 6 and 24 hour timepoints in mice receiving compound 7.1 compared to DIO mice receiving vehicle only. The change in body weight is shown in FIG. 4 starting on study day 5, the first day of administraton of compound 7.1. There was a notable mean percentage body weight change difference (4.9%, 95% CI (3.237, 6.538)) between the treated group and vehicle for DIO mice but not for MC4r (−/−) mice. Additionally, there was a statistically significant mean difference, 2.8%, 95% CI (1.281, 4.253), and p value<0.0001 between DIO mice receiving compound 7.1 and MC4r (−/−) receiving compound 7.1.

Each of the foregoing is merely illustrative, and other equivalent embodiments are possible and contemplated.

Although this invention has been described with reference to these preferred embodiments, other embodiments can achieve the same results. Variations and modifications of this invention will be obvious to those skilled in the art and it is intended to cover in the appended claims all such modifications and equivalents. The entire disclosures of all applications, patents, and publications cited above are hereby incorporated by reference.

The preceding examples can be repeated with similar success by substituting the generically or specifically described reactants and/or operating conditions of this invention for those used in the preceding examples.

What is claimed is:

1. A compound of formula III:

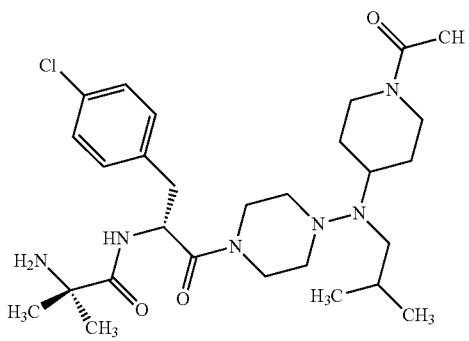

or an enantiomer, stereoisomer or diastereomer thereof, or a pharmaceutically acceptable salt thereof.

2. A pharmaceutical composition comprising a compound of claim 1, or a pharmaceutically acceptable salt of a compound of claim 1, and a pharmaceutically acceptable carrier.

3. The pharmaceutical composition of claim 2, further comprising at least one additional active pharmaceutical agent.

4. A method of treating a patient with a disease, disorder, condition or syndrome responsive to modulation of a melanocortin receptor, comprising administration to the patient of a pharmaceutically effective amount of a pharmaceutical composition of claim 2.

5. The method of claim 4, wherein the disease, disorder, condition or syndrome responsive to modulation of a melanocortin receptor comprises obesity.

6. The method of claim 4, wherein the disease, disorder, condition or syndrome responsive to modulation of a melanocortin receptor comprises metabolic syndrome.

7. The method of claim 4, wherein the disease, disorder, condition or syndrome responsive to modulation of a melanocortin receptor comprises pro-opiomelanocortin deficiency due to mutations in the POMC gene, Prader-Willi syndrome, obesity due to MC4r deficiency, leptin deficiency obesity, leptin receptor deficiency obesity, Bardet Biedl syndrome or Alström syndrome.

* * * * *